US007272947B2

(12) United States Patent
Anderson et al.

(10) Patent No.: US 7,272,947 B2
(45) Date of Patent: Sep. 25, 2007

(54) WATER PRODUCING METHOD AND APPARATUS

(75) Inventors: Rae (Ray) T. Anderson, Richmond (CA); Keith R. White, Mission (CA)

(73) Assignee: Everest Water, Ltd., Nassau (BS)

(*) Notice: Subject to any disclaimer, the term of this patent is extended or adjusted under 35 U.S.C. 154(b) by 0 days.

(21) Appl. No.: 11/221,075

(22) Filed: Sep. 6, 2005

(65) Prior Publication Data

US 2006/0059922 A1 Mar. 23, 2006

Related U.S. Application Data

(60) Provisional application No. 60/607,369, filed on Sep. 3, 2004.

(51) Int. Cl.
*F25D 21/00* (2006.01)

(52) U.S. Cl. ............................................. 62/272; 62/93

(58) Field of Classification Search ............... 62/93, 62/272, 285, 317, 389, 92, 283, 324
See application file for complete search history.

(56) References Cited

U.S. PATENT DOCUMENTS

| 1,931,347 | A |   | 10/1933 | Wright |
| 2,409,624 | A |   | 10/1946 | Granville |
| 3,035,418 | A |   | 5/1962 | Gay |
| 3,675,442 | A |   | 7/1972 | Swanson |
| 3,854,300 | A | * | 12/1974 | Gerhold ........................ 62/88 |
| 4,204,956 | A |   | 5/1980 | Flatow |
| 4,255,937 | A |   | 3/1981 | Ehrlich |
| 4,351,651 | A |   | 9/1982 | Courneya |
| 5,106,512 | A | * | 4/1992 | Reidy ......................... 210/744 |
| 5,149,446 | A |   | 9/1992 | Reidy |
| 5,203,989 | A |   | 4/1993 | Reidy |
| 5,259,203 | A |   | 11/1993 | Engel et al. |
| 5,301,516 | A |   | 4/1994 | Poindexter |
| 5,517,829 | A | * | 5/1996 | Michael ........................ 62/272 |
| 5,553,459 | A |   | 9/1996 | Harrison |
| 5,647,216 | A |   | 7/1997 | Garrett |
| 5,669,221 | A |   | 9/1997 | LeBleu et al. |
| 5,701,749 | A |   | 12/1997 | Zakryk |
| 5,845,504 | A |   | 12/1998 | LeBleu |
| 5,857,340 | A |   | 1/1999 | Garrett |
| 5,857,344 | A |   | 1/1999 | Rosenthal |
| 5,953,921 | A |   | 9/1999 | Garrett |
| 6,029,461 | A |   | 2/2000 | Zakryk |
| 6,058,718 | A |   | 5/2000 | Forsberg et al. |

(Continued)

FOREIGN PATENT DOCUMENTS

CA    2251095    10/1997

(Continued)

*Primary Examiner*—Melvin Jones
(74) *Attorney, Agent, or Firm*—Michael F. Hughes; Hughes Law Firm, PLLC

(57) ABSTRACT

A water producing system adapted to condense water from the air and collected in a storage tank were the water is purified and bacteria is killed. One form of killing the bacteria is utilizing an ozone injection system with a filter system to remove the ozone before the water is dispensed. In one form, a dual fluid circuit is utilized where an operating fluid dumps heat to a second circuit such as a refrigeration cycle and the cooled operating fluid lowers the temperature of a water condensation member.

67 Claims, 27 Drawing Sheets

U.S. PATENT DOCUMENTS

| | | |
|---|---|---|
| 6,182,453 B1 | 2/2001 | Forsberg |
| 6,209,337 B1 | 4/2001 | Edwards |
| 6,230,503 B1 | 5/2001 | Spletzer |
| 6,237,352 B1 | 5/2001 | Goodchild |
| 6,251,172 B1 | 6/2001 | Conrad |
| 6,289,689 B1 | 9/2001 | Zakryk |
| 6,307,287 B1 | 10/2001 | Garrett et al. |
| 6,343,479 B1 | 2/2002 | Merritt |
| 6,481,232 B2 | 11/2002 | Faqih |
| 6,490,879 B1 | 12/2002 | Lloyd et al. |
| 6,505,477 B1 | 1/2003 | Smith et al. |
| 6,574,979 B2 | 6/2003 | Faqih |
| 6,588,226 B1 | 7/2003 | Semrow et al. |
| 6,644,060 B1 | 11/2003 | Dagan |
| 6,684,648 B2 | 2/2004 | Faqih |
| 6,725,670 B2 | 4/2004 | Smith et al. |
| 6,755,027 B2 | 6/2004 | Garrett |
| 6,868,690 B2 | 3/2005 | Faqih |
| 6,931,756 B2 | 8/2005 | Morgan et al. |

FOREIGN PATENT DOCUMENTS

| | | |
|---|---|---|
| CA | 2341106 | 10/2001 |
| CA | 2477276 | 9/2003 |
| KR | 10-2004-0031651 | 4/2004 |
| KR | 10-2004-0031671 | 4/2004 |

* cited by examiner

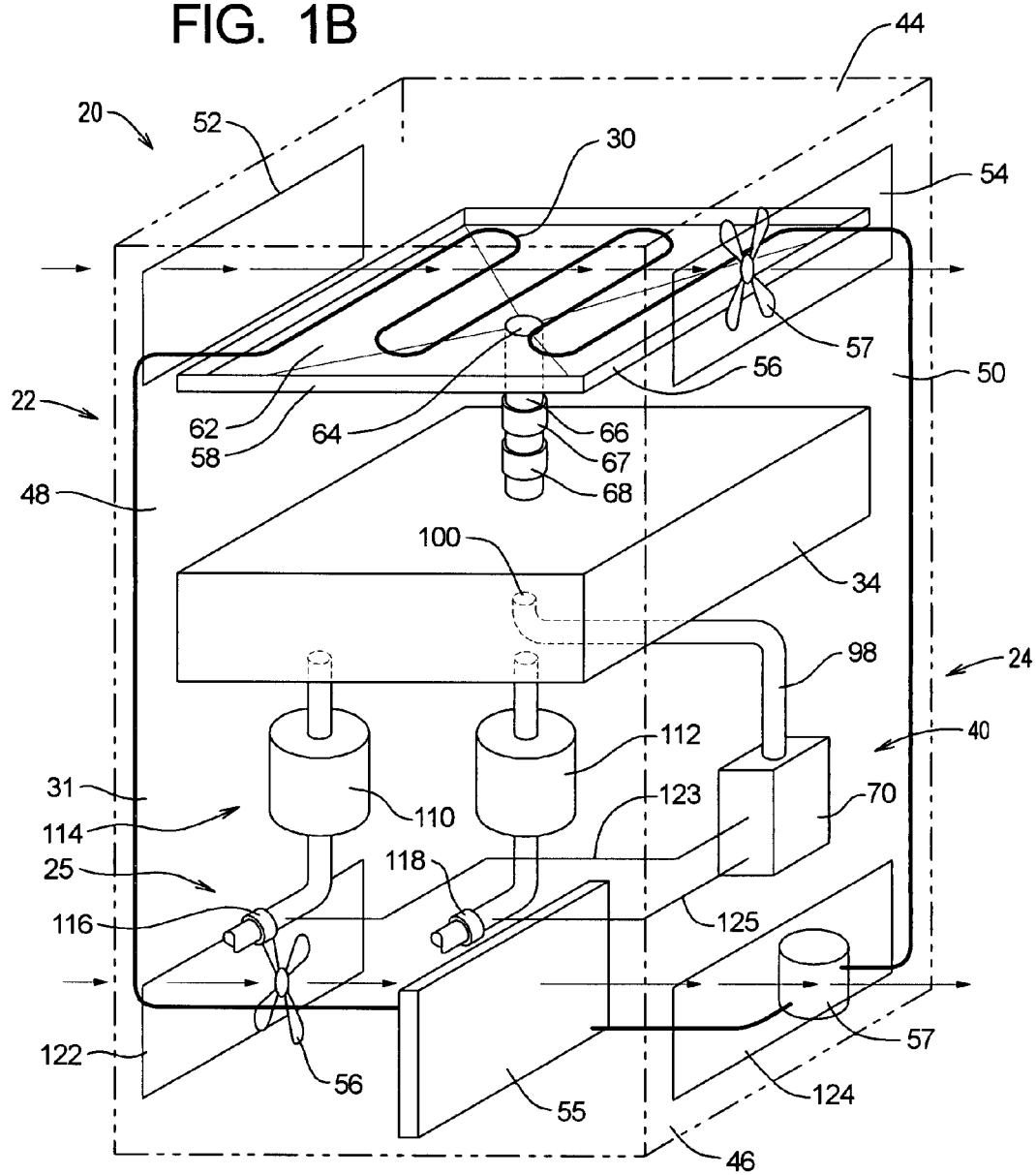

WATER PRODUCING METHOD AND APPARATUS

RELATED APPLICATIONS

This application claims priority benefit of U.S. Ser. No. 60/607,369, filed Sep. 3, 2004.

BACKGROUND

Potable water is essential to support and contribute to the well-being of societies. The mortality rate, particularly among young children, can be drastically reduced by providing clean, potable water, particularly in the case of preventable water-related diseases. It has been estimated that as many as 135 million people will die by the year 2020 where a causal factor for these deaths is unsafe drinking water as cited by the Pacific Institute for Studies in Development Environment and Security. Water scarcity is problematic in various regions of the world. Further, in developing societies it is desirable to have clean potable water to provide for employees in a workplace environment as well as family members in one's home. According to the World Health Organization in a report published in 2000, 1.1 billion people around the world lacked access to "an improved water supply". This report further assessed that there are 4 billion cases of diarrhea each year where the causal factor for such illness is a lack of access to clean water.

Further, in the present day of conflict and environmental terrorism, the world's water supplies which are traditionally vast, covering a large real estate, and very difficult to protect, can be used by environmental and biological terrorists in potential attacks. Such water supplies are generally part of a larger network whereby contaminating a portion of the supply can systematically contaminate and spoil a large volume of would-be potable water. Of course the potential health hazards as well as economic costs for such malicious attacks are immeasurable. As of Jan. 14, 2004, the United States has approximately 54,065 public and private water systems. The systems are all potentially vulnerable to attack by potential terrorists; however, little funding is directed towards protecting such a vast number of water systems. Further, the practical logistics involved in protecting such large and vast water systems is very cost-prohibitive, yet the desire to, and urgency of, maintaining a clean potable water supply is present.

Government regulations regarding it are often less stringent on bottled water than those for public water systems. The former is controlled by the Food and Drug Administration (FDA) and the latter by the Environmental Protection Agency (EPA). Interestingly, one third of all bottled water sold in the United States is actually taken from a public water system. Bottled water also has the disadvantage of having to store and carry heavy bottles.

In many countries, such as the various countries in the Middle East, clean water is desirable at various locations where electricity is provided; however, there are no natural reservoirs of water provided to support the needs of individuals residing in such areas. However, it is well known that the ambient air contains a certain amount of evaporated water therein. The study of water in ambient air is referred to the study of psychrometrics which relates, in general, to the amount of water in the air as expressed in absolute and relative humidity with respect to the temperature and pressure of the ambient air. In general, as the temperature of the ambient air drops, the relative humidity increases even though the absolute humidity remains constant. In other words, the ambient air loses its ability to hold water therein and when the temperature drops below a determined dewpoint, the water condenses into liquid form and essentially "falls out" of the air. Therefore, it is desirable to have a cooling element that sufficiently cools the ambient air to draw moisture therefrom. However, the cooling element should not dropped to a freezing point which militates the effort to extract water from the air.

Another known problem which has plagued such machines that employ psychrometric principles is the growth and harboring of bacteria within such devices. Although the basic concept of using a cooling element, which in one form is a part of the heat pump cycle, to extract water from the air has been known in the prior art, a recurring problem with such systems is the promotion of bacterial growth in the water loops which results in unclean water which is not consumable by individuals. Therefore, it is desirable to produce a system that is well suited to kill, and not promote, bacterial growth. Further, it is generally desirable to have water at a temperature other than room temperature for consumption purposes. In general, many consumers desire cooler water for drinking. Alternatively, for certain beverages such as tea or instant coffee, individuals desire warmer water below a boiling point, which in general is mixed with other material such as tea contained within a tea bag or instant coffee granules to provide a hot beverage. Such temperature conditions are fortuitously non-conducive for producing bacteria.

Of course the extraction of water from ambient air requires a non-closed-looped air circulation system that draws in ambient air from an air inlet port. The air inlet port preferably passes through a filter which is well-suited for removal of dust particles and the like. Thereafter, the air passes through a cooling element which in one form is an evaporator of a heat pump cycle.

As described in detail and the detailed description below, various other forms of cooling a water condensation member are discussed such as thermoacoustic, continuous absorption and other methods. Various embodiments are disclosed in the detailed specification which in general relate to methods of condensing the water and secondly purification of the same.

With regard to a heat pump cooling system, it should be noted that although water condenses on the cooling element, in one form the cooling element is referred to as an "evaporator" because the refrigerant fluid contained therein passes through an expander to reach the evaporator and this lower pressure refrigerant fluid internally evaporates and draws heat from the outer surface of the evaporator. It is well known in chemical principles that evaporation of a fluid requires heat. Of course various refrigerant fluids have different boiling points and condensation points. It is also well known that R-134A is a refrigerant medium that operates particularly well within the temperature ranges that are desired in a system such as a water producing and delivery device. Other refrigerants such as and not limited to are R-12, R134a, R-22, and R-410 that should function as well as an operating fluid for the various refrigeration cycles described herein. Therefore, as the internal refrigerant fluid evaporates and draws heat from the ambient air passing around the outer surface of the evaporator, the temperature of the evaporator/cooling element drops and hence the ambient air lowers in temperature as well. As the temperature of the ambient air drops to about just above the freezing point, the water will condense and fall to a collection drip tray.

One of the embodiments shown herein shows a dual loop system where the water condensation member has a separate circuit than a refrigeration cycle. This provides a tremendous amount of flexibility for creating water and be in a more desirable section of a psychrometric chart to drop more water from the air in a given atmosphere condition then instead of using only an evaporator coil from a refrigeration cycle system. Basically, a heat exchanger from a water producing circuit with a medium such as glycol (propylene glycol, ethylene glycol, etc.) provides flexibility and flow rates and design of a water condensation member.

As described in detail herein, the collection trip tray in one form is in communication with a potable water fluid circuit that is thoroughly described below. A reservoir tank and filter system as well as hot water tanks all provide functions within the water producing and delivery device to deliver potable water that is clean and bacteria-free and ready for immediate consumption by individuals.

SUMMARY OF THE DISCLOSURE

Below is described a water producing device adapted to remove moisture from the air. The water producing device comprises a water condensation member positioned above a collection tray. The water collection tray having a conduit for communication with a main tank adapted to have water positioned therein. There is an ozone generator producing ozone gas that is in communication with the main tank. There is also a first filter in communication with the main tank that is adapted to have ozone pass therethrough and is in communication with the ambient air. A fluid dispensing portion is provided adapted to provide fluid through an exit nozzle and a dispensing nozzle. A second filter positioned between the main tank and the dispensing nozzle for removal of ozone gas.

In one form the first filter further is in communication with the collection tray to allow water to pass through to the main tank and the first filter further is in communication with the collection tray to allow water to pass through to the main tank.

The main tank in one form is in communication with a hot holding tank and a cold holding tank whereby the hot holding tank is adapted to have heated water contained therein to a hot dispensing nozzle and the cold holding tank is adapted to hold cold water therein and disburse water to a cold dispensing nozzle. The second filter can be positioned in the fluid circuit between the hot holding tank and the hot dispensing nozzle and another second filter is positioned between the cold holding tank and the cold dispensing nozzle.

The rapid cold producing device is a plate heat exchanger for removing heat which is a plate heat exchanger for removing heat from the water of the cold holding tank.

In another form a water producing device is described adapted to condense water from air as water condensate. The water producing device comprises a water collection portion that has a water condensation member positioned above a water collection tray where water condensate is adapted to drip downwardly from the water condensation member to an upper surface of the water collection tray. A conduit is in communication to a lower opening of the collection tray and adapted to take water therefrom. There is further a purification portion is present comprising an iodine injector adapted to inject iodine to the water within the main tank. A water delivery portion comprising an iodine removing filter positioned downstream from the main tank adapted to remove iodine from the water. Finally a dispensing nozzle is present downstream of the iodine removing filter.

In this embodiment there can be a main tank line in communication with the main tank and passes through a first heat exchanger that cools the water in the main tank line before passing to the water condensation member. The main tank line is in communication with a cold dispensing line in communication with a cold dispensing nozzle downstream of the heat exchanger where a pressure sensor detecting low pressure in the cold dispensing line activates a pump of a rapid cooling circuit.

Another embodiment shows a water producing circuit comprising a water condensation member in fluid communication with a fluid line adapted to have an operating fluid with a freezing level below that of water pass therethrough. A pump is provided that is in fluid communication with the water communication circuit adapted to bias the operating fluid therethrough. An operating fluid sump is adapted to hold the operating fluid therein or alternatively the line is closed and sealed. A heat pump cycle is present having a condenser coil member in thermal communication with the operating fluid sump that is adapted to pull heat from the operating fluid. An expander upstream of the evaporator coil and downstream from a condenser coil is present. There is further a compressor interposed in the fluid circuit between the evaporator coil up and the condenser coil which is common in heat pump/refrigeration cycles. The heat pump cycle and the water producing circuit are fluidly discrete circuits.

In another form system for producing water from air having evaporated water therein by forming condensation droplets. The system comprises a water condensation member adapted to be positioned in an air stream having the evaporated water and further have the condensation droplets formed thereon. There is also a collection tray adapted to collect condensation droplets from the water condensation member. A first collection tank is provided that is in communication with the collection tray. A fluid line is in communication with the first collection tank that is adapted to bias the water through the filter assembly. A refrigeration circuit is provided having an evaporator coil in thermal communication with a heat exchanger, the heat exchanger having an inlet port and an outlet port adapted to allow water to pass therethrough downstream from the filter assembly. In this system there is a valve system adapted to direct refrigerant to either the heat exchanger or to the water condensation member. The heat exchanger outlet port is in communication with a dispenser nozzle for distributing cold water.

The numerous embodiments showed various methods of cooling in convincing water and purification of the same. Much more the details all of the embodiments can be better appreciated after reviewing the detailed description.

BRIEF DESCRIPTION OF THE DRAWINGS

FIG. 1B discloses another embodiment where ozone injection lines are positioned downstream of the hot and cold water tanks and upstream of ozone removing filters for flushing the tanks at intermittent times;

DETAILED DESCRIPTION OF THE EMBODIMENTS

Figure 1:
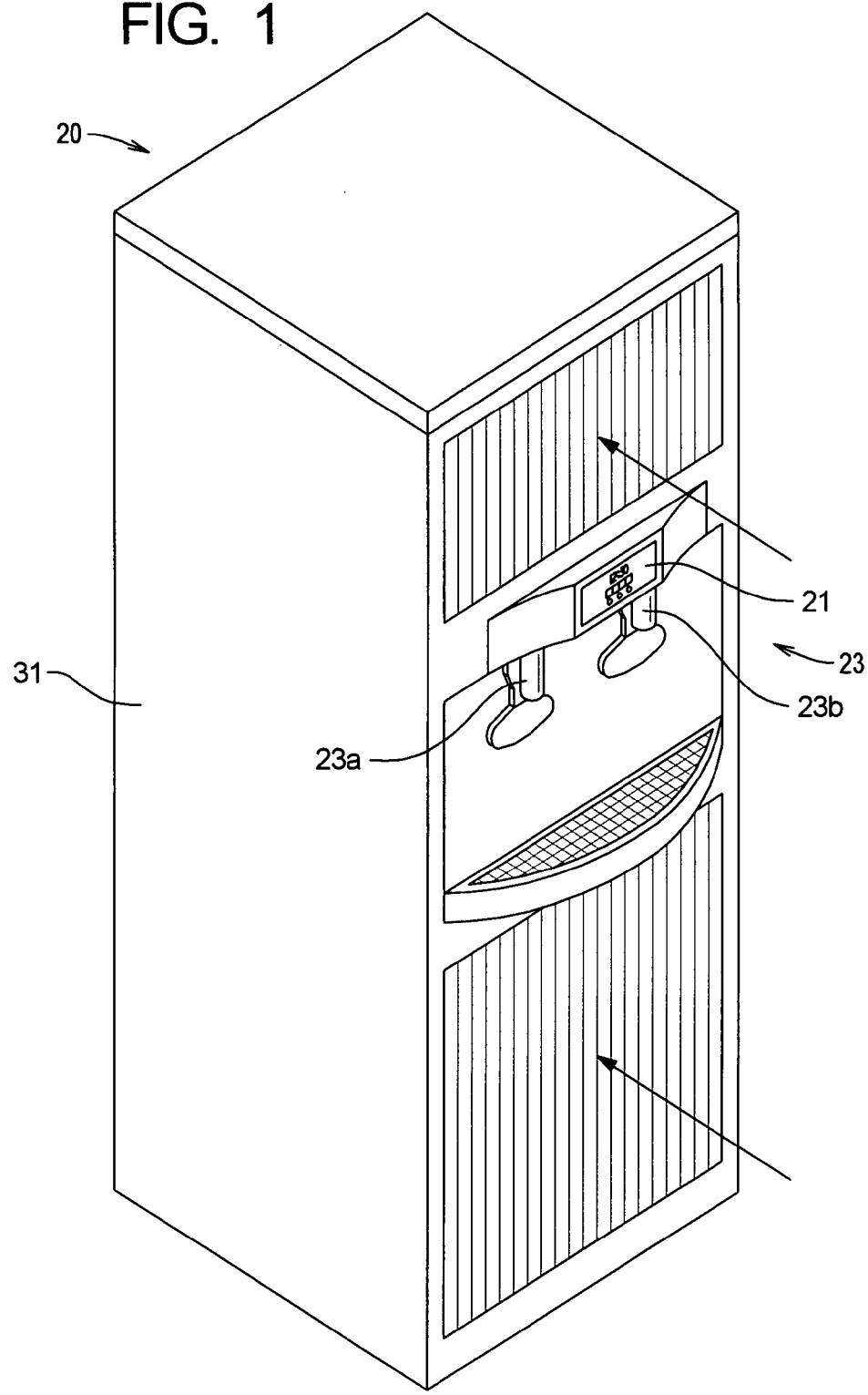
FIG. 1 discloses an isometric view of the water producing device 20 where in particular the casing and water dispensing area are shown.
Figure 1A:
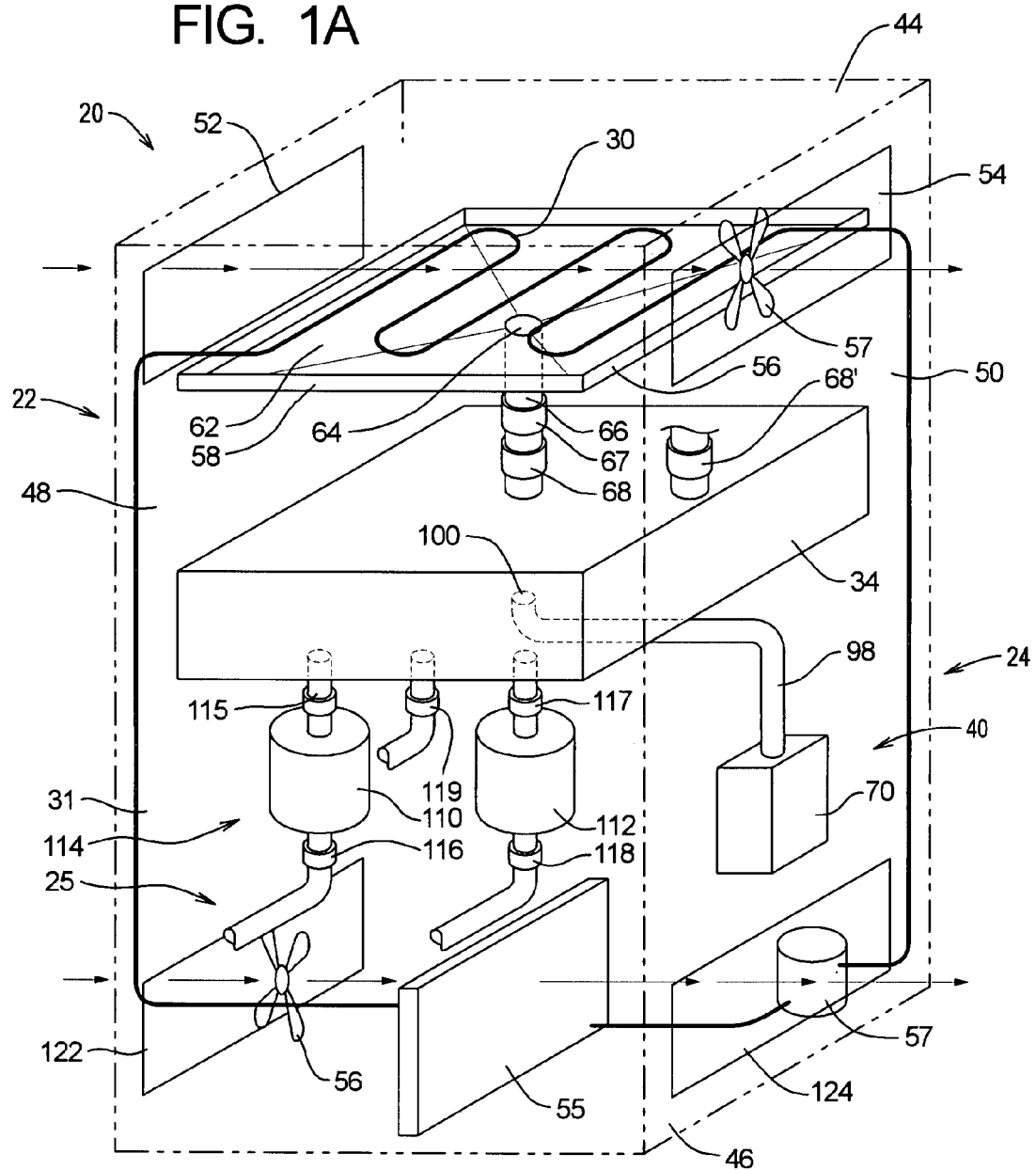
FIG. 1A discloses an isometric view of a first embodiment with a longitudinal airflow arrangement.

In general, the water producing device 20 as shown in FIG. 1A is a device that encompasses psychrometric principles to extract water from ambient air and condense the water for various purposes such as potable water. Below is a discussion of various embodiments for producing water by way of psychrometric principles by cooling air and collecting condensation droplets. Further, there are various methods for purification of the water which are described below. Of course various sections of each embodiment can be mixed and matched to comprise additional combinations and effectively different various embodiments. In general, the various embodiments illustrated in FIGS. 1–7 disclose a gravity fed type system. Of course various embodiments shown therein could be utilized with a loop-type system which is shown and discussed in FIGS. 12–28A.

In general, the water producing device as shown in FIG. 1A comprises a water collection portion 22, a water purification portion 24 and a water delivery portion 23. These portions will now be generally discussed below.

General Discussion of Components

The water collection portion 22 is shown in various forms herein. The basic operating principle of the water collection portion is providing a water condensation member 30 that is adapted to be cooled by various methods to lower the temperature of air passing thereby to condense the water therefrom.

Figure 29:
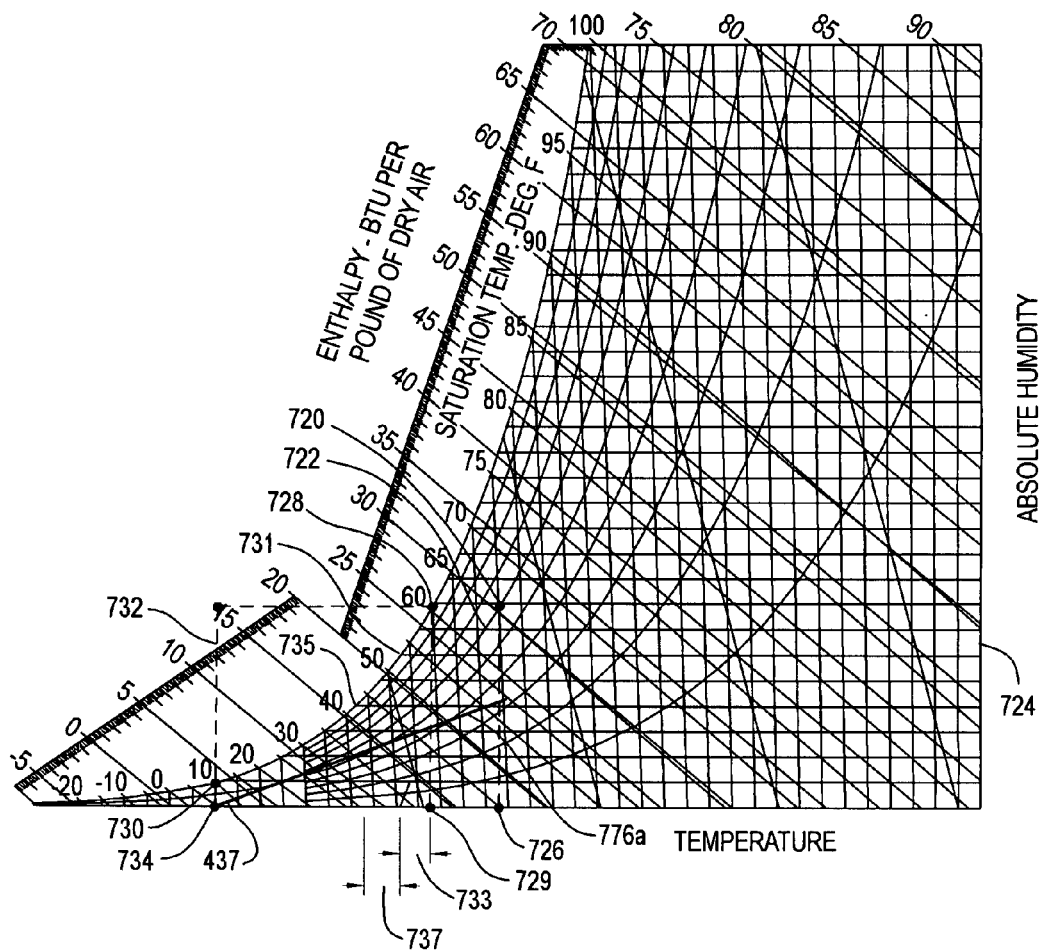
FIG. 29 shows and example of a psychrometric chart.

There will now be a discussion of the general principle of condensing water from the air with the aid of the chart as shown in FIG. 29. As air cools to a state as indicated at location 730 in the chart in FIG. 29, it can be appreciated that the vertical variation in the chart indicated at 732 indicates the amount of water which has condensed from this volume of air. It should be further noted that the temperature location indicated at 734 has dropped from the initial incoming temperature indicated at 726, but the temperature indicated at 734 should not be below the freezing point of the water which of course is approximately 32° F. (0° C.). Therefore, this basic psychrometric principal background knowledge is useful for determining that it is desirable to lower the temperature of the incoming air whereby the volume of air entering the open loop air system should have an efficient heat transfer mechanism to draw heat therefrom to properly lower the temperature past the 100% humidity location indicated at temperature value 729 to begin extracting water from the air.

Therefore, it can be appreciated that ambient air is cooled to its dew point and taken to a temperature therebelow to form water condensate.

Figure 2:
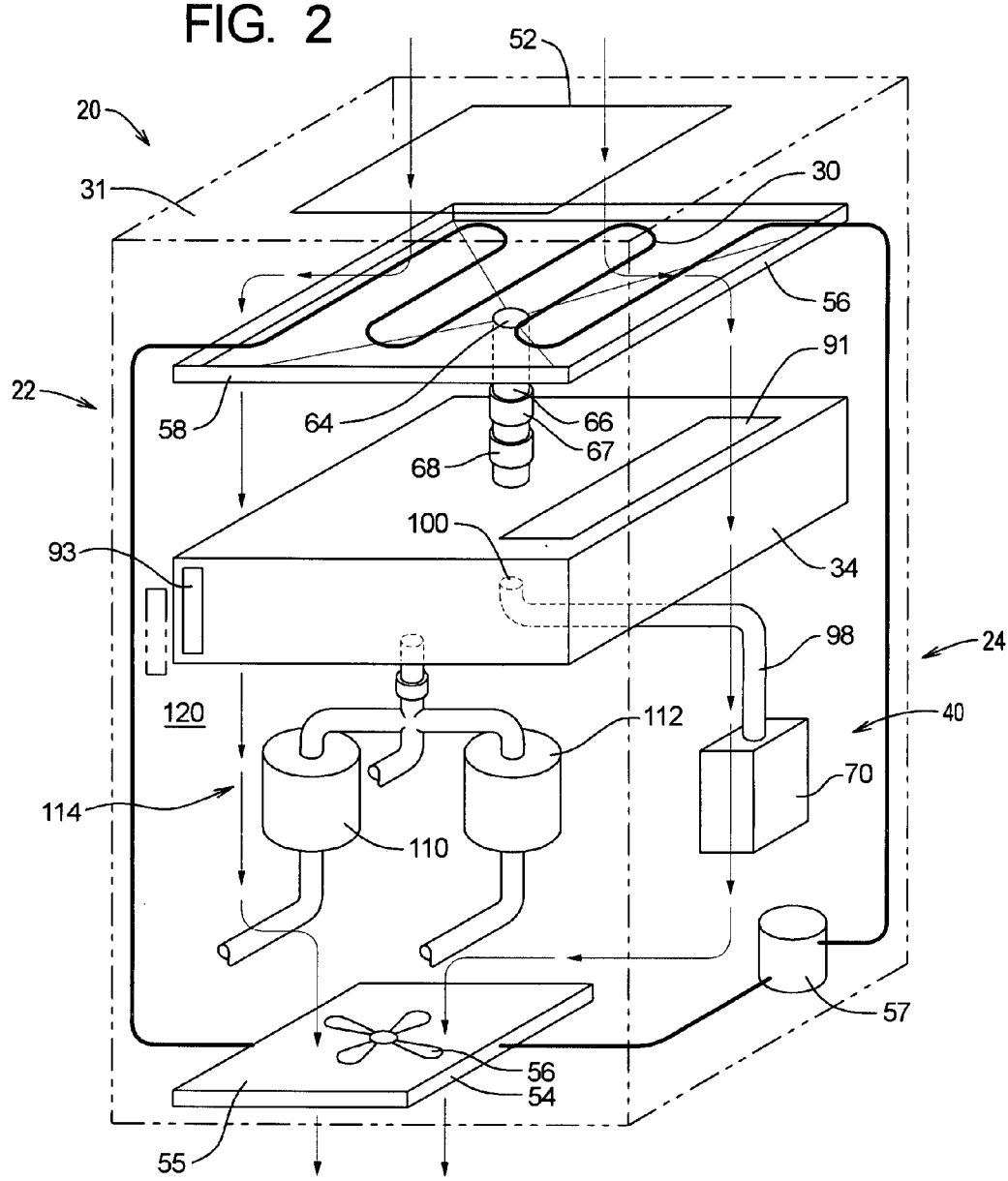
FIG. 2 discloses a variation of the first embodiment with a vertical airflow arrangement.

Reference is now made to FIG. 1A where in general the water purification portion 24 can be carried out in various forms were in one preferred form, as shown in FIG. 2 there is an ozone generation system 40 that is adapted to produce ozone and inject ozone within the main tank 34. This system will be described in further detail below with reference to FIGS. 6A and 6B in one preferred form of creating the ozone.

Figure 17:
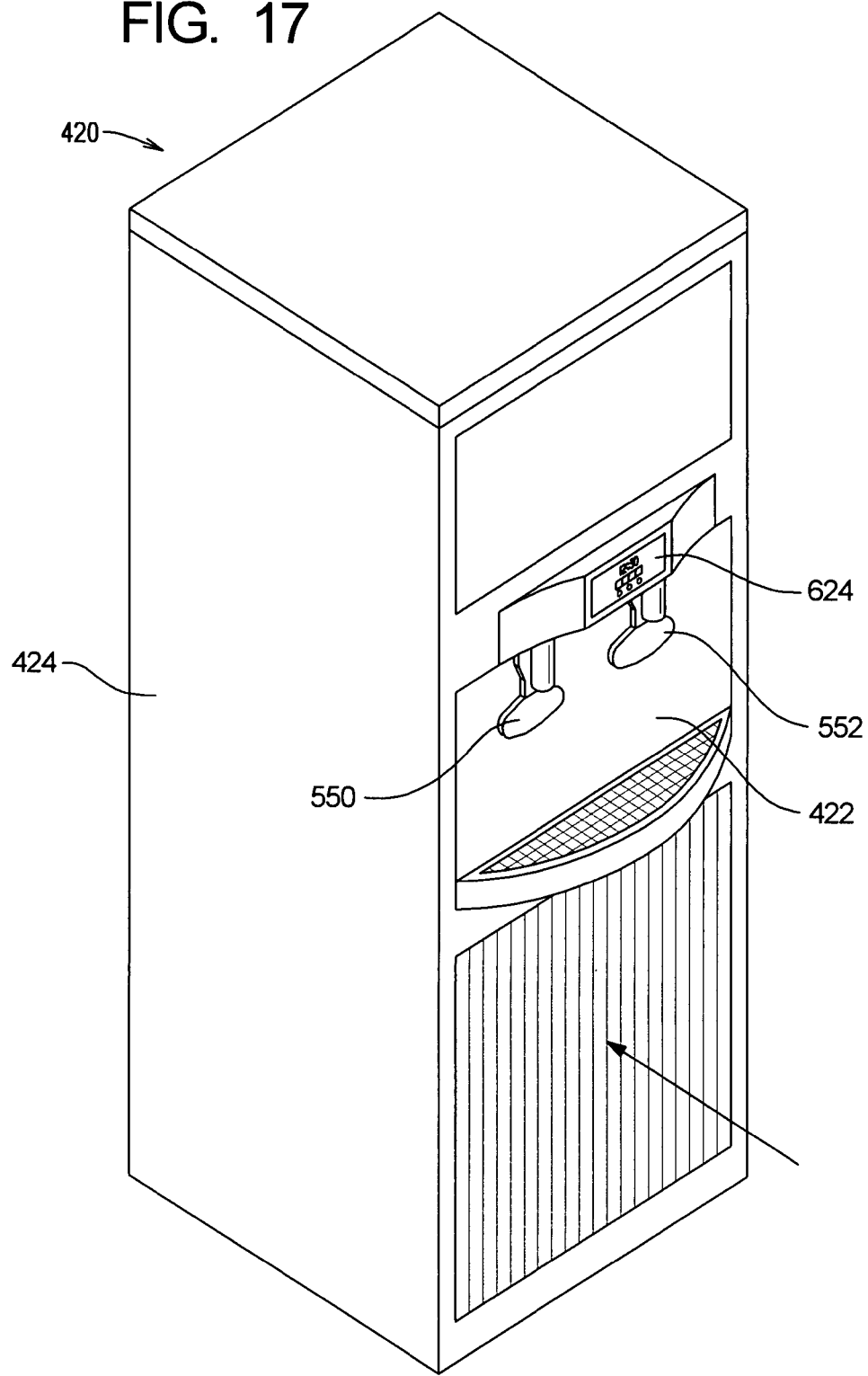
FIG. 17 is an isometric view of another water producing and delivery device.

Finally, the water delivery portion 26 essentially is the interface for distributing water where as shown in FIGS. 1 and 17, a system can encompass a hot and cold water nozzle as well as a room temperature nozzle.

Heat pump/refrigeration cycles are well understood in thermodynamic disciplines and generally comprise a condenser, an expander, an evaporator, a compressor and a refrigerant fluid. Some basic background information on the heat pump cycle is provided herein. The condenser and expanders are generally heat exchangers in some form which comprise elongated tubes circulated in a manner to maximize the exposed surface area. The heat pump cycle forms a close-loop circuit where the refrigerant fluid constantly heats up and cools down at various portions within the circuit. As the refrigerant fluid exits a compressor, the pressure of the fluid is increased substantially in pursuant to the natural gas law, and the temperature increases as well. The compressor is in communication with the condenser and the exiting hot refrigerant fluid which is warmer than the ambient conditions will cool down and condense to a liquid within the close looped system. Therefore, the refrigerant which is now under high pressure and in liquid form within the condenser, passes to an expander which is fluid communicationally interposed between the evaporator and the condenser.

The expander in general is an orifice type restrictor that maintains a pressure drop from the upstream side (near the condenser) to the downstream side (near the evaporator). The expander allows for a higher pressure within the condenser and as the refrigerant passes therethrough, the expansion of the refrigerant provides for immediate cooling which lowers the temperature of the evaporator. Therefore, the cool refrigerant, which is at a temperature below ambient conditions, draws heat from adjacent ambient air. Because the refrigerant has expanded to lower pressure, pursuant to the natural gas law of PV=nRT (or one of the equivalent natural gas equations) the temperature drops commensurately with the drop of the pressure to balance this equation. The drop in temperature is conducted through the outer surface of the evaporator coil and this heat gradient with the ambient temperature draws heat thereto. Depending upon the location within the close-loop stream in the evaporator, the refrigerant having a rather low boiling point will evaporate therein drawing heat from the ambient conditions. Thereafter, the gaseous refrigerant passes to the compressor where it is re-compressed and the closed looped circuit continues.

Detailed Discussion of Components and Systems

Referring back to FIG. 1A, there will be a discussion of the preferred form of extracting, purifying and delivering water. It should be noted that described throughout there are various combinations for executing various functions of the water producing device 20. For example, there are a plurality of ways of cooling the water condensate member 30 which will now be described in detail with reference to the various figures. Further, various methods of purifying the water are described, many of which can be used in conjunction with the various methods of condensing and obtaining the water. Therefore, it should be appreciated that various combinations of elements can be combined for a wide variety of embodiments which are greater than the number of figures disclosed herein. Further, various optional components such as hot and cold water tanks can be incorporated.

By way of a of electro-kinetic air transporter similar to that as described in U.S. Pat. No. 6,163,098 and U.S. Pat. No. 4,789,801 which are hereby incorporated by reference. Discussed herein is a preferred method of purifying the water and cleansing it of bacteria by way of an ozone generator. The ozone generator is defined broadly to cover methods of producing ozone as described herein as well as other storage type containers to distribute ozone. Alternatively, other methods exist, such as iodine impregnated into a resin substrate which is disclosed further herein. Therefore, the general portions such as the water collection portion 22 and the water purification portion 24 can be mixed and matched to comprise additional embodiments.

As shown in FIG. 1A, the water producing device 20 comprises a casing 31 having an upper portion 44 and a lower portion 46. The casing 31 further has a first longitudinal portion 48 and a second longitudinal portion 50. An air inlet 52 is provided, and as shown in FIG. 1A the area inlet is located at the upper portion 46 and ambient air is adapted to pass therethrough to the interior portion of the casing 42. Located in the lower portion 46, the air exit 54 is provided where the air biasing member 56 is positioned adjacent thereto. In this embodiment, the casing is substantially hermetically sealed but for the air inlet and air outlet 52 and 54 whereby the lower pressure within the casing by the air biasing member 56 causes air to pass through the air inlet 52 and through the water condensing member 30.

Figure 2A:
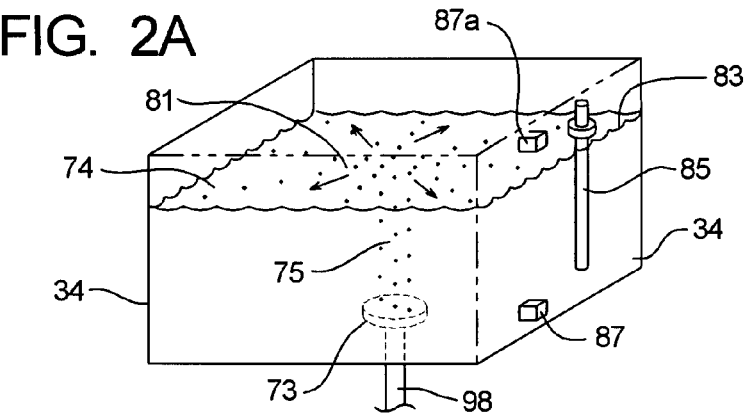
FIG. 2A discloses the main tank in detail showing various sensors and an ozone diffuser.
Figure 2B:
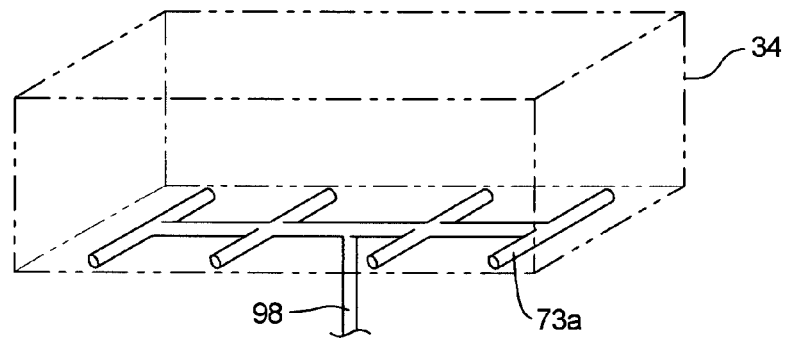
FIG. 2B discloses another type of diffuser for a larger tank.

It should be noted that the embodiment as shown in FIG. 1A shows an arrangement where the air inlet 52 is positioned at the first longitudinal portion 48 and the air exit 54 is positioned at the second longitudinal portion 50. This orientation is desirable where as shown in FIG. 2F, the units can be stacked in a manner where air enters a first longitudinal portion 49 of the collection 18 of units 20 and exits at the second longitudinal portion 51.

Referring now to FIG. 2, the water collection portion 22 comprises the aforementioned water condensate member 30 and the collection tray 56. The collection tray has a perimeter portion 58 that extends around the extremes of the water condensation member 30. The perimeter portion should encompass the extremes of the water condensation member whereby dripping water therefrom should land upon the upper surface 62 and be directed to the passageway 64. In a preferred form, the upper surface 62 slopes toward the passageway 64 so the water does not pool on the surface 62. The passageway 64 is in communication with the channel 66 which passes through a first filter 68. In a preferred form, the first filter 68 is employed which, as described in detail below, can operate in conjunction with one form of the water purification portion 24 that utilizes an ozone generator. Further, the sediment filter 67 can be positioned downstream of the collection tray 56 which is adapted to remove sediment material from the incoming water. Of course this is optional and an incoming filter located at the air intake 52 can remove a large majority of solid material and bacteria for certain filters such as impregnated iodine filters. The first filter 68 can have a dual benefit of purifying the downwardly flowing water that is gravity fed from the collection tray 56 to the main tank 34, and further purify the air traveling upwardly from the main tank 34 to the passageway 64 and eventually to the surrounding atmosphere. It should be noted that the term "first filter" (and "second filter" for that manner) although is written in a singular form is defined to possibly have more than one physical filter to comprise the filter. For example the first filter could comprise of a filter for the incoming water and another filter for the exiting gas/ozone. Further, the second filter assembly 114 may consist of one filter such as that as shown in FIG. 2.

Downstream of the first filter 68 is the main tank that is introduced above which is adapted to hold water therein. As described further herein, the main tank can be further utilized for distributing water not only for consumption or its intended purpose, but further for channeling it through the water condensation member 30 as described further herein with references to FIGS. 3 and 4.

With the foregoing description of the water collection portion 22 in mind, there will now be a thorough description of the water purification portion 24. It should be noted that the references 22 and 24 for the general portions are not necessarily exact specific components that are clearly delineated to each portion, but rather these portions represent general functional componentry that in some cases work synergistically together to perform the various discrete tasks of collecting water and purifying the water and insuring bacterial growth is minimized.

Figure 6A:
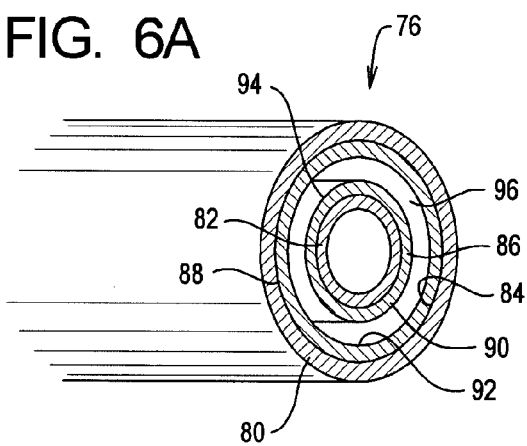
FIG. 6A discloses a preferred form of trading ozone with any electrolyzer tube basically having an insulated passageway to allow air to pass therethrough.
Figure 6B:
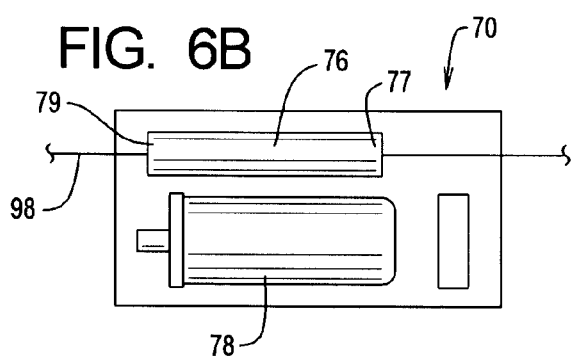
FIG. 6B shows a schematic view of an ozone generator.

The water purification portion 24 as shown in FIG. 2 comprises the ozone generation system 40 having an ozone generator 70 which, as shown in FIG. 6B, comprises an electrolyzer tube 76 and a spark generator 78. Of course in other forms the ozone generator can be an ozone source such as an ozone tank or an ozone generator with the capacitance tank to hold ozone therein and keep it stable.

As shown in FIG. 6A, the electrolyzer tube 76, in a preferred form, comprises a first electrically conductive cylinder 80 and a second electrically conductive cylinder 82. The second electrically conductive cylinder has a center axis that is substantially co-linear with the center axis of the first cylinder 80. Interposed between the outer surface 86 of the cylinder 82 in the inner surface 84 of the outer cylinder 80, are a set of acid resistant material coatings. In one form, a first glass cylinder 88 is positioned adjacent to the surface 84 and an inner glass tubing 90 is positioned adjacent to the outer surface 86 of the second electrically connected cylinder 82. The inner surface 92 of the glass cylinder 88 and the outer surface 94 of the glass cylinder 90 define a passageway 96 allowing air to be passed therethrough. A fan or other type of air biasing device can bias the air through the passageway 96. As shown in FIG. 6B, the electrolyzer tube 76 has a first end 77 and a second end 79. Essentially, the air enters the first end 77 through the passageway 96 (see FIG. 6A) and exits through the second end 79 and passes though line 98 to the main tank 34 as shown in FIG. 2.

Line 98 is in communication with opening 100 which injects ozone therein. Present experimentation has found that injecting the ozone at broad range of 10–250 milligrams per hour or 75–150 milligrams in a more narrow range. However successful result have been found at 10 millgrams/hr for a ten gallon storage tank or thereabout to produces a desirable effect. Of course these rates are changed with respect to the size of the tank and the throughput of water therethrough. The ozone rises up to the center portion of the main tank 34 and distributes radially outwardly therefrom with what appears to be a fairly thorough and complete distribution for killing bacteria.

Figure 23:
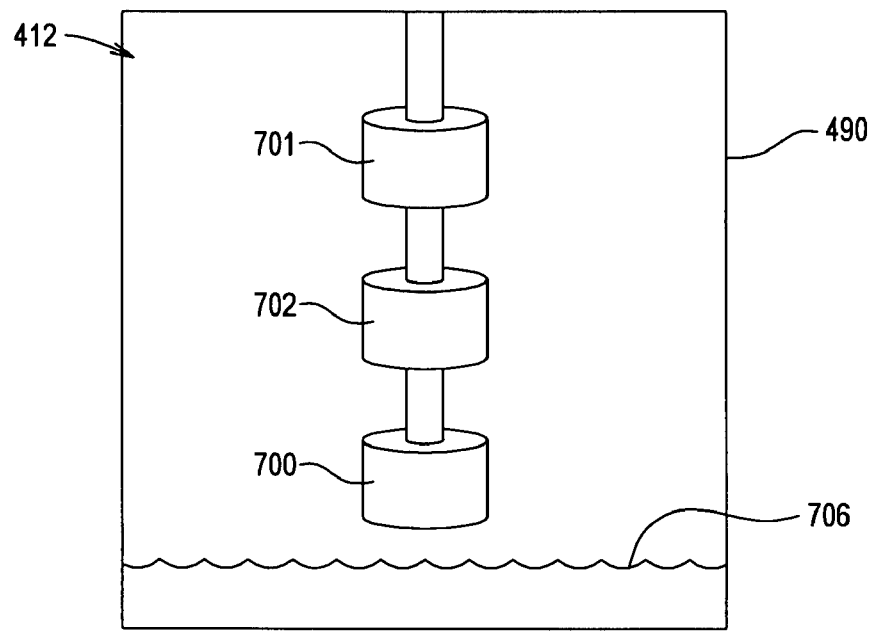
FIGS. 23–26 show various states of the trifloat sensor system that is end position in the second reservoir tank whereby the trifloat system is one way of controlling the operations of the system.
Figure 24:
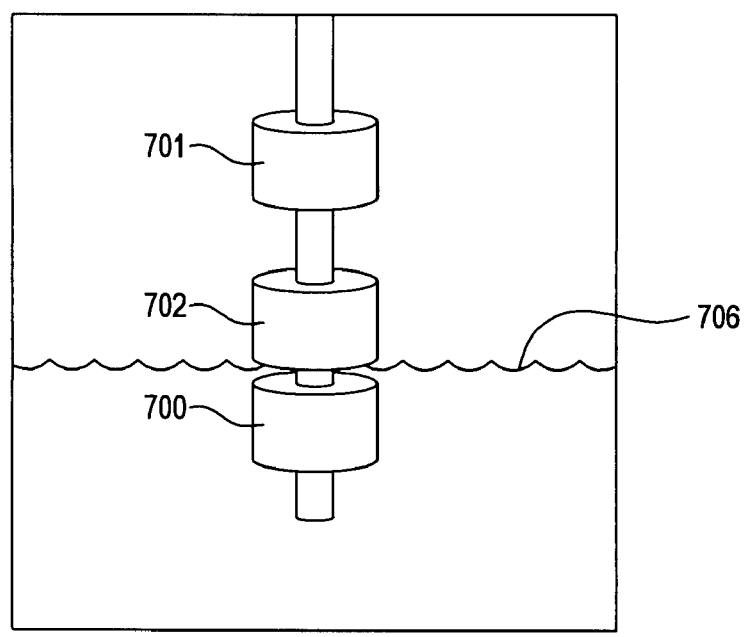

As shown in FIG. 2, the tank 34 has an inspection opening 91 which allows inspection of the contents of the tank 34 and access to the trifloat or the float sensor system (see FIG. 2A) similar to that as shown in FIG. 23 for the control system of the unit 20. The panel 91 can be a removable panel and optionally have a transparent section to allow visual inspection without any removal of such a panel. Further, the main tank 34 can have a sight glass 93 which allows for visual inspection of the water and material contained therein. This allows for viewing the ozone at the perimeter portion and in one form is nice to have in the corner region to ensure the ozone is reaching the extremities of the main tank 34.

The ozone generator in one form is on timer and produces ozone ten minutes for every hour. The ozone generator could further be controlled by the ozone sensor as shown in FIG. 2A or on continuously if it is properly sized to the tank. As shown in FIGS. 2A and 2B, there are more detailed views of the main tank 34 where FIG. 2A has a diffuser 73 which in one form is a microporous material such as pumice, Kynar® or glass or other conventionally material which forms the ozone bubbles 75 in a much smaller diameter which essentially creates a greater surface area to interface with the water and kill bacteria. Present analysis indicates that this type of system radiates the ozone radially outward at the upper surface 79 in a direction as indicated by the arrows 81 to get the perimeter portions 83 of the tank 34. Present analysis further indicates that biofilm is most likely to occur in the perimeter portions 83 of the tank particularly near the surface. This diffuser method of injecting the ozone has been found to be very effective against biofilm and prevent formation of material growing on the surface of the tank 34. FIG. 2B discloses a manifold system where the diffuser 73a has lateral extensions for a larger tank. In this embodiment, essentially the ozone is distributed out over a larger area to cover a larger tank, say for example 100 gallons or more.

In general bacteria are microscopically small, single-cell creatures having a primitive structure. The bacteria body is sealed by a relatively solid-cell membrane. Ozone interferes with the metabolism of bacterium-cells, most likely through inhibiting and blocking the operation of the enzymatic control system. A sufficient amount of ozone breaks through the cell membrane, and this leads to the destruction of the bacteria. Viruses are small, independent particles, built of crystals and macromolecules, Unlike bacteria, viruses multiply only within the host cell. They transform protein of the host cell into proteins of their own. Ozone destroys viruses by diffusing through the protein coat into the nucleic acid core, resulting in damage of the viral RNA. At higher concentrations, ozone destroys the capsid, or exterior protein shell by oxidation so DNA (deoxyribonucleic acid), or RNA (ribonucleic acid) structures of the microorganism are affected.

In general ozonation of water is considered a "clean" process and does not produce any undesirable chemical by-products other than ozone itself which is handled by the first and second filters. However, the same aggressive nature which gives ozone the ability to attack and kill microorganisms also makes it especially tough on the materials which come in contact with it. The components exposed to ozone must be ozone resistant to lengthen the life and efficiency of the system. One type of material is produced by Griffin Technics, Inc., of Lodi, N.J., Kynar® polyvinylidene fluoride (PVDF) is a choice for injection nozzles, tubing, diffusers and other constructions. Materials to be utilized for compentents in contact to ozone can be found at www.ozonesolutions.info. A list of possible materials in shown below with a rating of the material's effectiveness to resistant oxidation to ozone.

| Material | Rating |
|---|---|
| ABS plastic | B - Good |
| Brass | B - Good |
| Bronze | B - Good |
| Butyl | A - Excellent |
| Chemraz | A - Excellent |
| Copper | B - Good |
| CPVC | A - Excellent |
| Durachlor-51 | A - Excellent |
| Durlon 9000 | A - Excellent |
| EPDM | A - Excellent |
| EPR | A - Excellent |
| Ethylene-Propylene | A - Excellent |
| Fluorosilicone | A - Excellent |
| Glass | A - Excellent |
| Hastelloy-C ® | A - Excellent |
| Hypalon ® | A - Excellent |
| Inconel | A - Excellent |
| Kalrez | A - Excellent |
| Kel-F ® (PCTFE) | A - Excellent |
| LDPE | B - Good |
| PEEK | A - Excellent |
| Polyacrylate | B - Good |
| Polycarbonate | A - Excellent |
| Polysulfide | B - Good |
| Polyurethane, Millable | A - Excellent |
| PTFE (Teflon ®) | A - Excellent |
| PVC | B - Good |
| PVDF (Kynar ®) | A - Excellent |
| Santoprene | A - Excellent |
| Silicone | A - Excellent |
| Stainless steel - 304 | B - Good/Excellent |
| Stainless steel - 316 | A - Excellent |
| Titanium | A - Excellent |
| Tygon ® | B - Good |
| Vamac | A - Excellent |
| Viton ® | A - Excellent |

FIG. 2A further has a float sensor 85 which is utilized to shut off the mechanism to cool the condensation coil 30 to prevent further water from being generated. The float sensor would interface with the control box to function the controls. There is further an ozone sensor in one form within the tank 34 which detects whether ozone is present and which indicates if the ozone generation system 40 is operational. The ozone sensor 87 can either be submersed in the water or positioned thereabove the water as indicated by 87a. Further, an ozone detector outside of the tank can be present to indicate if there is any leak to detect if ozone is leaking or if the system is somehow malfunctioning within the casing. This optional ozone sensor basically is another failsafe system to ensure the system is functional. Further, the ozone sensor as shown in FIG. 2a can be utilized to determine the amount of ozone and this can regulate the production of ozone and be used by the control system to determine how much ozone to emit to the tank 34.

It should be noted that the first and second filters 68 and 114 could be other forms and carbon filters and could be for example UV light which is adapted to have ozone ($O^3$) go back to $O^2$. In this area the UV light is not necessarily in place to kill bacteria but rather remove the ozone from the system so it does not expel into the drinking water or the final water ejected from the system 20 or emitted into the air. Further, heat can be utilized to convert the ozone. As shown in FIG. 1A, the first filter can also be as shown at 68' where only gas from the main tank exits therefrom. The filter 68' can be in conjunction with a downward filter 68 or a downward filter 68 can be removed entirely. If only filter 68 is used than it functions to both filter the incoming water and exiting gas with ozone.

It should be further noted that the main tank as shown in say for example FIG. 2B can be a bladder system whereby the bladder is made of a flexible material that is one form ozone resistant with the ozone killing system and water entering therein will fill the bladder and as water exits the bladder will decrease in volume whereby air is not present in the bladder which aids in mitigating bacterial growth. This system as a course can be utilized for the embodiment as shown in FIG. 17.

It has been found that a desirable type of ozone collecting filter to comprise the first and second filters is a conventional carbon filter. In a preferred form, the first filter 68 is a carbon filter which as described above is gravity fed from the collection tray 56 and further is adapted to absorb ozone flowing upwardly from the main tank 34. The first filter 68 could comprise other filters as well, such as a sediment filter for collecting potential sediment material that can accumulate in the collection tray 56.

Positioned beneath the main tank 34 are the hot tank 110 and the cool tank 112. In a preferred form, hydrostatic pressure biases the water from the main tank 34 to the hot and cold tanks 110 and 112. The hot tank can have a conventional electric type heater to keep the water therein and be properly insulated. Further, the hot tank should have an inner surface which is resistant to ozone such as stainless steel or the like. The cool tank 112 can operate on its own heat pump cycle where a separate compressor and expander provide a working fluid which cools the water within the tank 112. Downstream from the hot and cold tanks 110 and 112 is a second filter assembly 114 having filters 116 and 118. In one form, the filters 116 and 118 are carbon filters that are adapted to remove ozone from the water.

FIG. 2 shows an alternative arrangement where the second filter indicated at 120 is positioned upstream from a manifold distributing to the hot tank, cold tank and room temperature water distribution lines. In this embodiment, the ozone is removed upstream from the hot and cold tanks and only one filter is required. Of course this can be used in conjunction with the airflow schematic as shown in FIG. 1A as well as other embodiments described herein.

Alternatively, as shown by the hatched line, a single second filter 120 can be utilized upstream from the hot and cold tanks 110 and 112. With this arrangement, the tanks 110 and 112 do not necessarily need to be ozone resistant.

The first and second filters 68 and 120 (or the filter assembly 114 to operate as the second filter) should be reasonably accessible to the end user for replacement at periodic intervals dependent on time or usage. Of course the control interface display 21 as shown in FIG. 1 could display an indicator to change the filters by determining a proper period of time or usage of the device where a flow meter can be interjected somewhere along the fluid path to determine the amount of flow therethrough. Further, changing of the filters could be determined by the amount of ozone generated by the ozone generator system 40 or by a flow meter in the line to indicate the quantity of water passing therethrough.

Figure 2C:
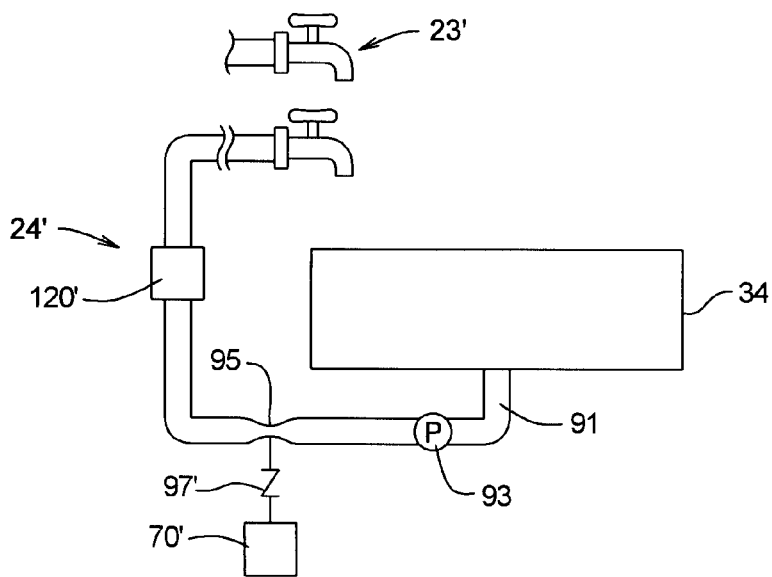
FIG. 2C discloses another ozone distribution system utilizing a pump and venturi-type ozone extractor.

As described in FIG. 2C, there is another configuration of a water purification portion 24' where a water line 91 passes through the pump 93 and a Venturi-like member 95 is adapted to increase the velocity and cause a low pressure therein which is common in a Venturi and a line with a check valve 97 is in communication to an ozone generator/tank 70'. A second filter 120' is adapted to remove the ozone before the water is delivered to the water dispensing portion schematically indicated at 23'.

Figure 2D:
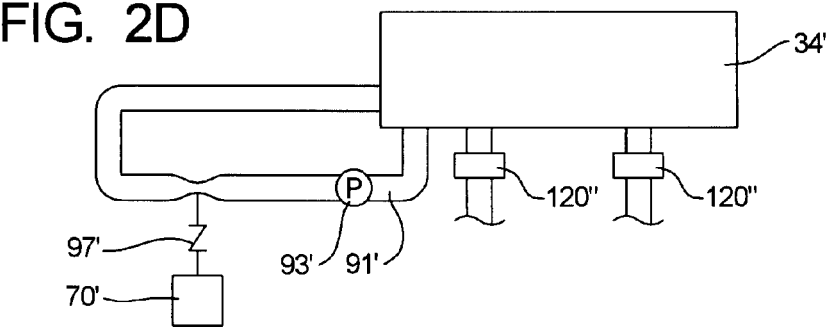
FIG. 2D discloses a system similar to FIG. 2C except the ozone line circulates back to the main tank.

As shown in FIG. 2D there is a variation of FIG. 2C where the water line 91' passes through the pump 93' and there is an ozone generator 70' adapted to pass ozone through the check valve 97' to Venturi 95'. The line 91 essentially circulates back to the main tank 34'. A second filter arrangement indicated at 120 is adapted to remove ozone before dispensing the water.

It should be noted that the above two noted embodiments as illustrated in FIGS. 2C–2D illustrate another method of injecting ozone where it can be appreciated. There are a variety of methods of mixing ozone to the water and subsequently removing it therefrom (or keeping it therein if the water is to be stored for example). A Venturi can have an added benefit of creating a very turbulent mixture which circulates the ozone very thoroughly. The embodiment as shown in FIG. 2C may be particularly helpful in an on-demand type system. It should be noted that the ozone generator is shown by way of one example in the various embodiments and any number of ozone generators can be employed which includes storage-type containers of ozone. The check valves 97 and 97' should have a fairly low cracking pressure since the lower gauge pressure of the Venturi may be relatively small.

Further, the systems as described in FIGS. 1–2D could be a hydrogen peroxide type injection system where hydrogen peroxide is utilized to kill bacteria. Further, a product referred to as Oxylink could also potentially be utilized for killing bacteria where the carbon filters or other type of proper filters for removing these additives can be utilized. In this form, the ozone generator 70 could alternatively be a hydrogen peroxide tank injecting hydrogen peroxide into the system.

Figure 2E:
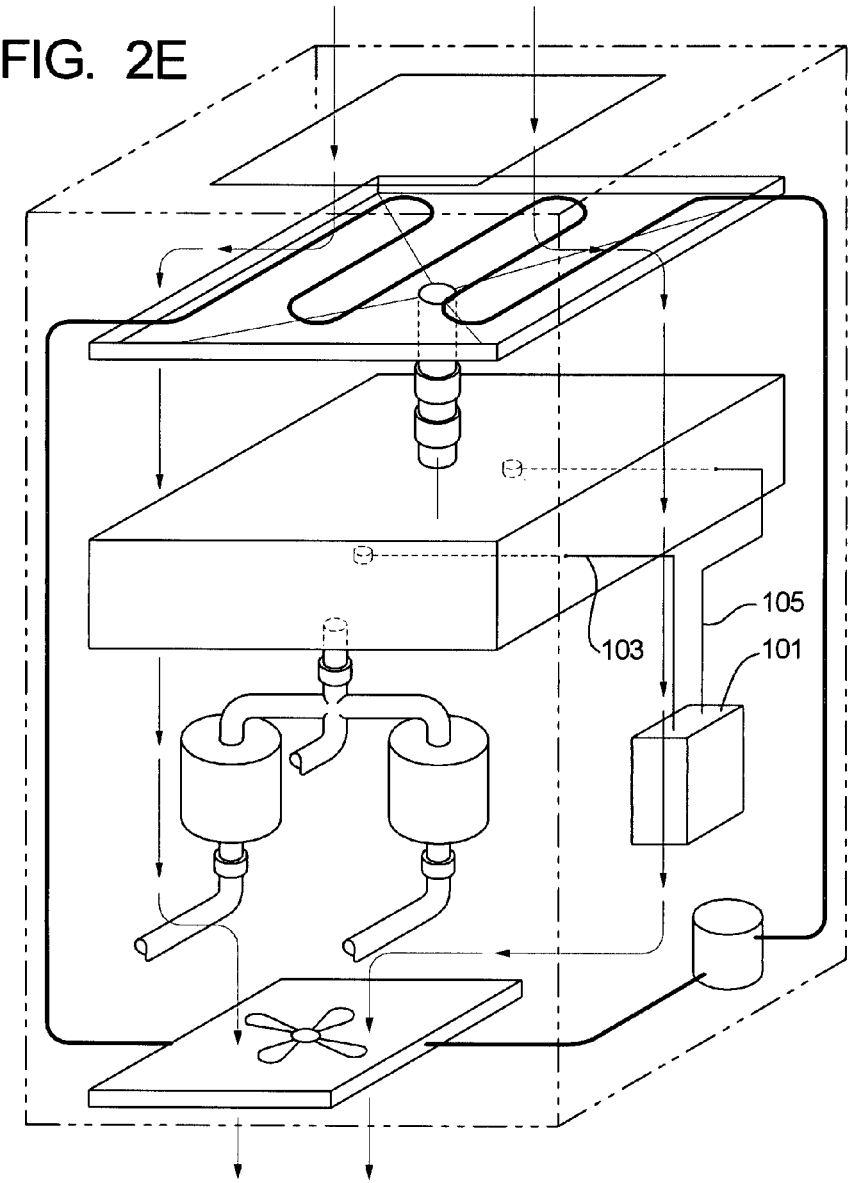
FIG. 2E discloses another bacteria killing device where electrodes are positioned within the main tank.
Figure 2F:
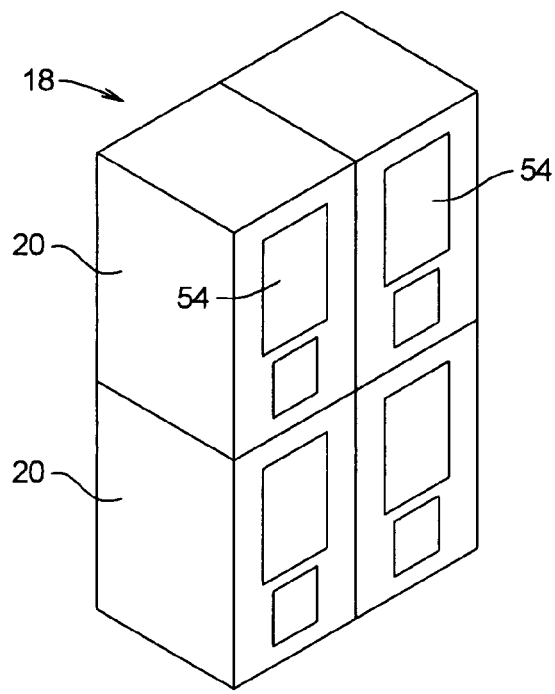
FIG. 2F discloses an arrangement of water producing devices stacked upon one another.

FIG. 2E shows yet another embodiment where the electronic generator 100 and when comprises first and second electrode line 103 and 105 that are adapted to carry positive and negative charges therein. Essentially, the electrode line have an electrode portion positioned within the tank that delivers electrical charge thereto. Present analysis indicates that this is a operational way of killing bacteria. The analysis further is based upon that the killing mechanism is the production of byproducts which is believed to be ozone. Therefore, the ozone removing filters are suited to be used in this embodiment.

Figure 2G:
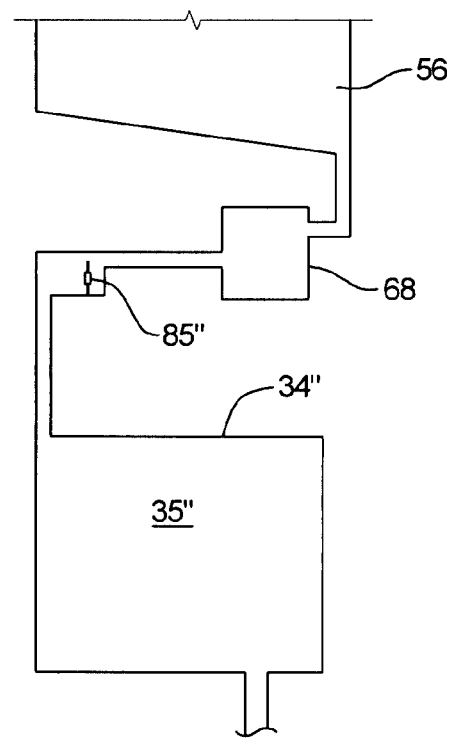
FIG. 2G shows a schematic embodiment of a float system positioned above the main tank.

FIG. 2G shows a modification to the main tank 34" where the float sensor 85" is positioned above the main tank compartment indicated at 35" where the first filter is positioned upstream of the float sensor 85". This embodiment is desirable in situations where the air volume within the main tank 34" is desired to be minimized. In certain situations bacteria is more conducive to grow around the perimeter portions 83 as shown in FIG. 2A. Therefore, it can be desirable to keep water production at a maximum to fill the tank 34" until the flow sensor 85" turns off the water production. The filter 68 in FIG. 2G can be vertically orientated.

Positioned in the lower portion of the casing 31 is the set of hot coils 55 that are in fluid communication with the water condensing member 30 (which is an evaporator in a heat pump cycle) and the compressor 57 compresses a refrigerant fluid through the hot coils (condensing coils to condense the operating refrigerant fluid/gas) where the air cools by way of the biasing member 56 and the fluid passes to the water condensing member 30 where the water condenses on the outer surface.

Now referring to FIG. 1A, there is shown a similar assembly whereby the air intake 52 and air exit 54 are positioned at the first longitudinal portion 48 and second longitudinal portion 50 respectively. As shown in FIG. 2F, this air flow scheme allows for a stacking arrangement where air flows from the first longitudinal portion to the second longitudinal portion in all of the units 20 that comprise a water producing assembly 18. Positioned in the lower portion of the casing 31 is the hot coil 55 with the air biasing member 56 adapted to move air from the port 122 to the port 124. In one form, the air travels in the same direction as indicated by arrow 126 from the first longitudinal portion to the second longitudinal portion of the casing 31. It should be noted that the air biasing member 57, which one form is a rotary fan, can be utilized to transfer the air exiting the port 54 and air conditioning purposes. Further, the port indicated at 124 in FIGS. 1A and 1B can be utilized to be channeled for heat for any purpose where heat is required or desired.

The filter at the air intake 52 should have in one form a sediment-type filter to remove particulate matter from the air coming inward. One form is having an antibacterial filter which in one form has iodine or some antibacterial agent contained therein or peroxymonosulfate made by DuPont which goes by the trade name L-Gel. The incoming air can have an electrostatic air filter or an air ionizer to assist in killing incoming bacteria.

In a dead leg situation for the lines down stream of the tanks and 110 and 112 as shown in FIG. 1B, the ozone accessory lines 123 and 125 can be utilized to pump ozone upstream of the carbon filters 116 and 118 in FIG. 1B for mitigating bacteria growth. Such interjection can be done at a periodic time based on a PLC controller at off hours such as midnight or in the wee hours of the morning or other any time when use is minimal. Further, a flow meter can be positioned in the sensor which detects a lack of flow for a period of time which would instigate an influx of ozone through the auxiliary lines. It should be noted that the lines 123 and 125 can be positioned downstream of the filters 116 and 118 or an additional set lines can be in communication at this location with a different valving system two pass ozone thereto. Essentially, if the downstream line of the carbon filters is relatively long and a long period of time is past or other factor indicating bacterial growth may be present in the deadly, ozone can be injected into this side is downstream of the ozone air moving filters 116 and 118.

The unit 20 can further be an air purifier, particularly when the technology as recited in U.S. Pat. No. 4,789,801 is utilized where particulate matter is removed from the air and further air is biased across the water condensation members 30. It should be noted that the unit is fairly quiet and the decibel rating is very low where the ozone generator is particularly quiet in its particular configuration and the embodiment as shown in FIGS. 1 and 2 with a gravity feed-type system tends to have a very low noise rating.

Various coatings for the components for evaporator coil/water condensation member 30 can utilized such as polyurethane, Teflon, nickel plating, baked phenolic on the exterior of the evaporator coil. It should be noted that in FIG. 1A, an EPR valve can be utilized with the compressor which modulates the coil temperature to maintain it just above freezing. Further, a hot gas bypass can be utilized where gas from the evaporator coil 55 is directed back upwardly toward the water condensation member 30 to prevent freezing. A sensor that sits on the evaporator coil clicks on with a modulating valve to adjust the air flow.

In another form, as shown in FIG. 1A, the temperature gauge indicated at 39A can indicate a low-temperature where the bypass 39B is invoked and essentially goes around the expander 37 to essentially increase the pressure within the water condensation member 30 which is a condenser and evaporator coil. The types of compressors 57 can be a scroll, linear, reciprocating, and rotary.

It should be further noted that the sensor indicated at 39a could be that of a thermister which is an electrical communication with the air biasing member/fan 57 to control the rate of the volumetric throughput based on the temperature of the water condensation member.

There will now be a discussion of various other methods of reducing the temperature of the water condensation member 30 with reference to FIGS. 3–5A.

Figure 3:
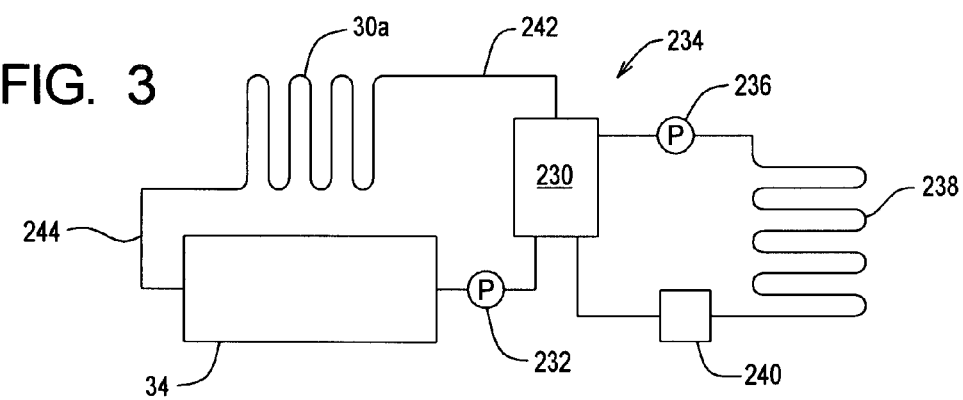
FIG. 3 discloses an optional arrangement of cooling the water condensation coils where a rapid heat exchanger such as a plate heat exchanger is utilized to cool water that is extracted from the main tank and circulated back thereto after passing through the water condensation coils.

FIG. 3 shows an embodiment where the water condensation member 30A provides a passage therein and is in communication with the main tank 34. Present analysis indicates that having colder water within the main tank helps to inhibit bacterial growth. Further, a cool temperature, particularly a cool temperature on a surface, is needed to form condensate to drip to a collection tray as described above. Therefore, a rapid heat exchanger 230 which in one form is a plate heat exchanger can be utilized where the pump 232 biases water from the main tank 34 through a heat exchanger to the water condensation member 30. In one form, the rapid heat exchanger is cooled by way of a heat pump cycle 234 which has the compressor 236 the refrigerant operating fluid condenser coil 238 and an expander 240. The refrigerant evaporator coil (the cold coil) is within the rapid heat exchanger 230.

Figure 30:
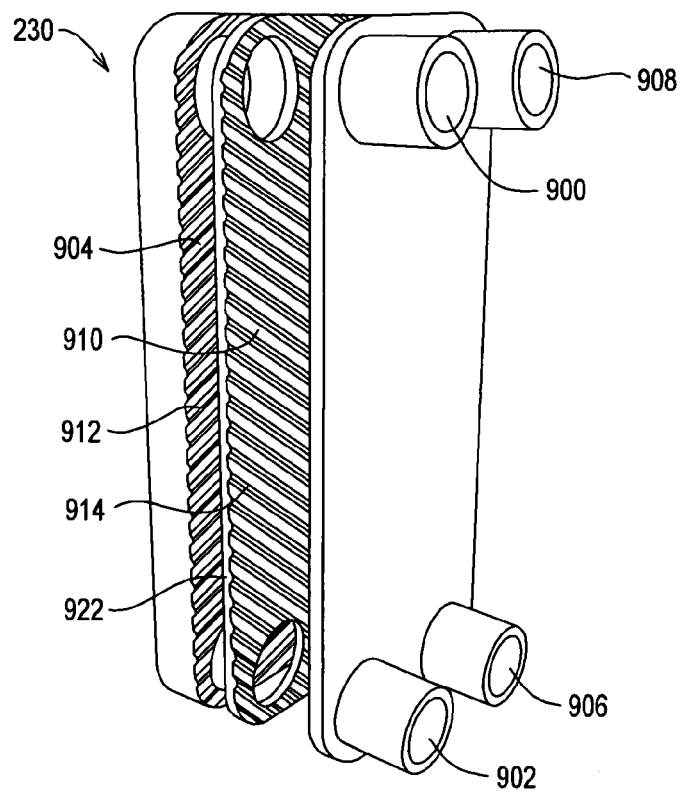
FIG. 30 shows in exploded view of one form of a plate heat exchanger.
Figure 31:
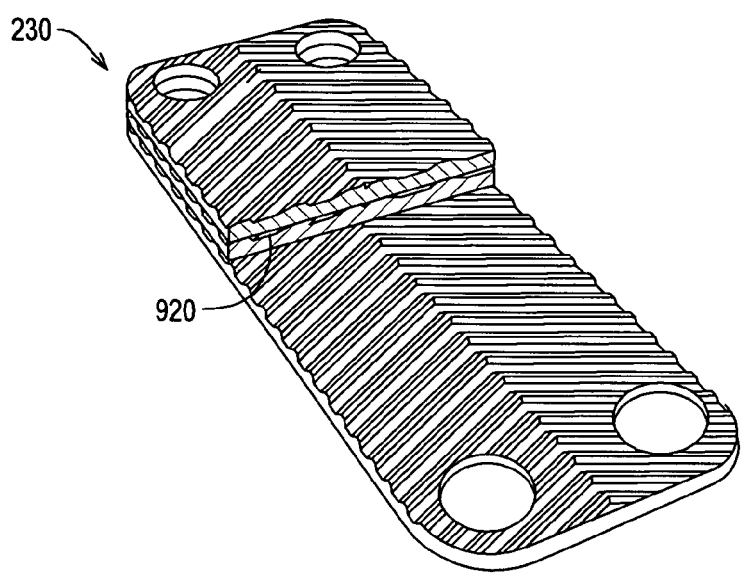
FIG. 31 shows isometric partial sectional view of a plate heat exchanger.

One form of a plate heat exchanger is shown in FIGS. 30 and 31 which is similar to that of a conventional plate heat exchanger sold by St. Clair Systems of Romeo, Mich. In general, there is in the port the rapid heat exchanger 230 that comprises a first inlet port 900 and the first outlet port 902 which is for example in communication with the chamber that as shown in the exploded view of FIG. 30 at 904. The second inlet and outlet ports 906 and 908 are adapted to have a second fluid pass therethrough which could be communication with the chamber defined at 910 where the unit is fully assembled.

Plate heat exchangers are considered advantageous for being utilized as a rapid heat exchanger because the various opposing ripples 912 and 914 create a turbulent flow where a partial sectional view in FIG. 31 shows the crisscross light pattern creating discrete passageways 920 along each fluid circuit layer. One preferred form, the heat exchanger 230 is comprised of a plastic material where because the operating fluid may operate at relatively low pressure is and within a reasonable temperature range, a plastic injection molded process can be utilized where the plates such as 922 as shown in FIG. 30 can be stacked to give additional parallel fluid circuits to alter the amount and rate of heat transfer in different designs of the water producing unit 20. Further the plastic could be highly thermally conductive or have thermal conductive material molded therein. Also given the low pressures the plates can be thin to have less thermal resistance between the two discrete fluids.

Essentially, as water is pumped by way of the pump 232 through the main tank line 242, the heat pump system 234 is in operation and cools water within the main tank line 242. The main tank line has a return portion 244 that feeds back to the main tank 34 at presumably a cooler temperature, which is somewhat warmer than the portion of the line preceding the water condensation member 30A.

Figure 4:
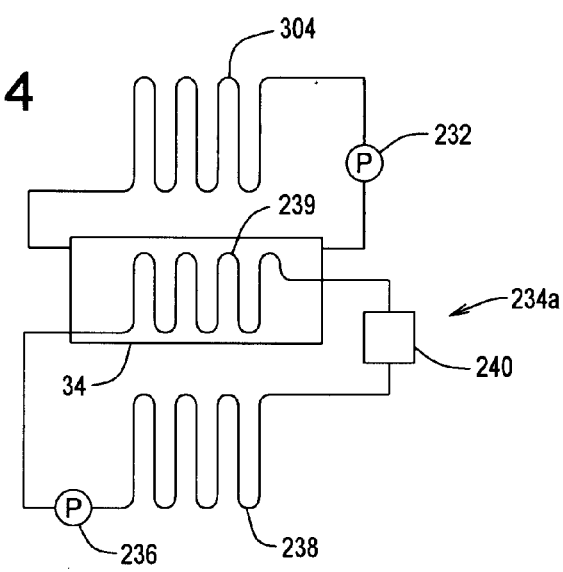
FIG. 4 shows another embodiment where instead of using a rapid heat exchanger, the evaporator coil (the cold coil) of a heat pump/regfrigeration system is positioned within the main tank where the water is positioned and circulated to the water condensation member.

FIG. 4 shows another embodiment whereby the cold coil (refrigerant evaporator coil) 239 of the heat pump system 234A is positioned within the main tank 34 or otherwise in thermal communication therewith direct or otherwise. In this embodiment, the entire mass of water within the main tank 34 is cooled and passed through the water condensation member 30A.

Figure 5:
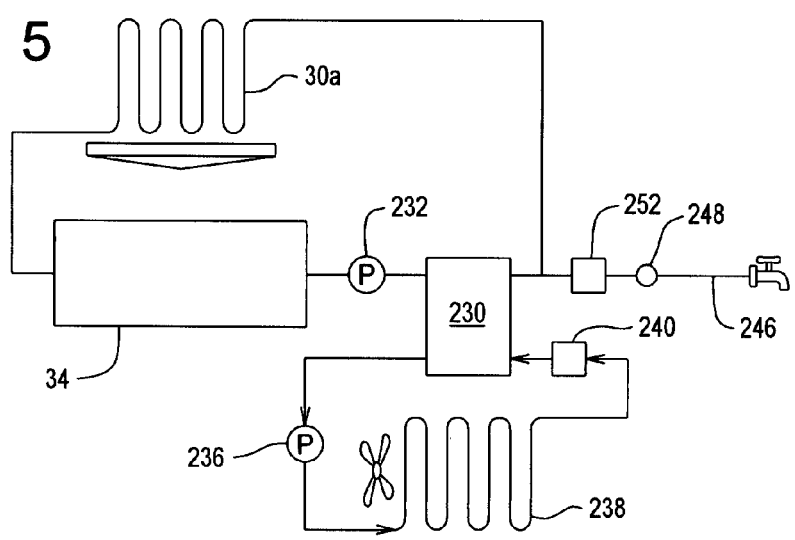
FIG. 5 discloses another variation of FIG. 3 were the rapid heat exchanger has a water dispenser on that can distribute cold water from the main tank and divert the cold water from the water condensation circuit/rapid cooling circuit.

FIG. 5 shows a modification of the system as shown in FIG. 3 whereby a cold dispensing line 246 is downstream from the rapid heat exchanger 230. Essentially, the pressure transducer 248 detects a reduced pressure in the water dispensing line 246 which occurs when the nozzle 250 is depressed whereby someone or some mechanical action is dispensing cold water therefrom. The nozzle 250 can be the fluid dispensing portion in a similar manner as shown at 23 in FIG. 1. The nozzles 23a and 23b can be utilized to dispense hot and cold water from lines the hot and cold tanks/insta-heaters and insta-cold members. Further, a third nozzle can distribute room temperature water or a switch in the control panel 21 When the pressure drops within the line 246, a control system can activate the pump 232 which passes water through the main tank line 242, and an ozone removing filter 252 is positioned preceding the nozzle 250. This filter is similar to the second filter described above and in a preferred form is a simple carbon filter which is well-suited for moving ozone in its aqueous form in the water. Of course if the water is not being utilized for potable water, the various filters can be removed, and in fact in some cases where ozone is desirable in certain industrial applications, it may be beneficial to leave the ozone therein or leave the ozone for prevention of bacterial growth and filter the water at a future time as it remains stored in an ozone resistant tank.

Figure 5A:
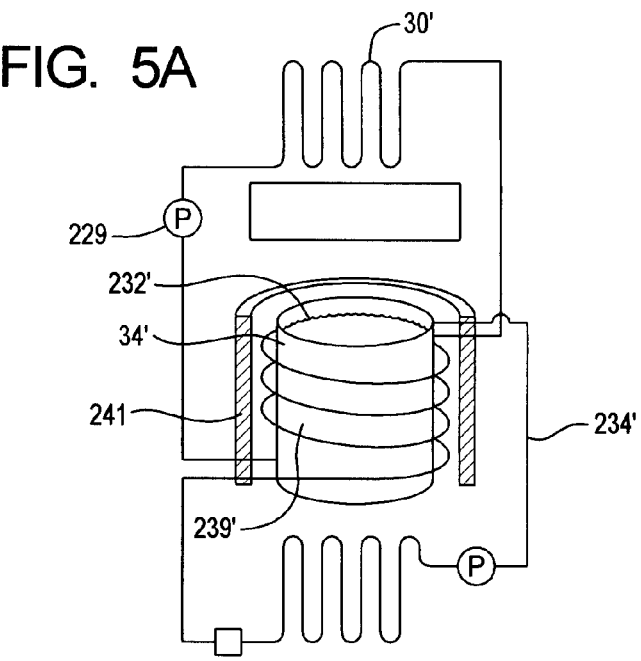
FIG. 5A shows another method of cooling the main tank and utilizing water therefrom for the water condensation member.

FIG. 4 can have an alternative arrangement where the cooling coil 239 is positioned around the tank 34 and insulation is then placed therearound. This embodiment is illustrated in FIG. 5a where downstream of, the main tank 34 has the evaporator coil positioned therearound with an insulating member around that. Basically FIG. 5A discloses a cooling system where an evaporator coil is positioned around the main tank 34' is and heat is drawn therefrom the water 229 contained within the tank 34'. An insulation layer 241 is positioned therearound to focus the extraction of heat from the water mass 229. A circulation pump 232' circulates water from the tank 34' through the water condensation member 30' for condensation water droplets passing through an air stream. The heat pump/refrigeration cycle 234' is similar to that is described above. It should be noted that a thermally-conductive plastic could be utilized for many of these heat exchanger-type members such as the rapid heat exchanger as shown in FIG. 4.

Figure 7:
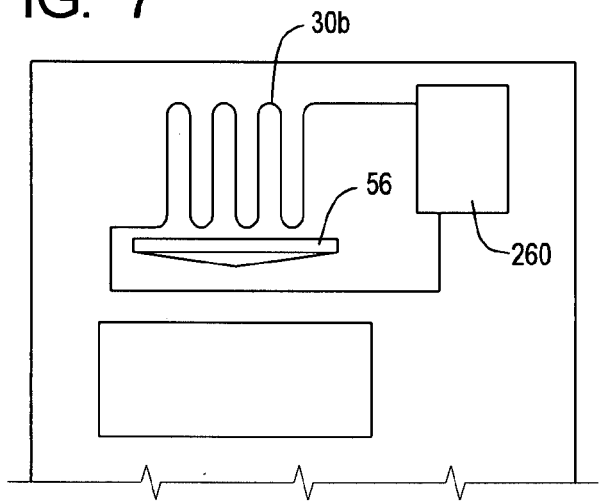
FIG. 7 discloses a schematic view showing a continuous absorption system.

As shown in FIG. 7, there is a continuous absorption system 260 where the water condensation member 30B is positioned above the collection tray 56. Continuous absorption systems are well known in the prior art and a brief description of one form of a system is described below.

The continuous-cycle absorption cooling system 260 can operated by the application of a limited amount of heat. This heat can be furnished by gas, electricity, kerosene or solar power or any other heat source. In one form no moving parts are employed.

In general, the unit consists of four main parts similar to the above mentioned refrigeration cycle: the boiler, condenser, evaporator and the absorber. When the unit operates on kerosene or gas, the heat is supplied by a burner or the like. This element is fitted underneath a central tube. When operating on electricity, the heat is supplied by an element inserted in a pocket like portion. The unit charge can be comprised of a quantity of ammonia, water, and hydrogen. These are at a sufficient pressure to condense ammonia at room temperature.

When heat is supplied to the boiler system, bubbles of ammonia gas are produced. They rise and carry with them quantities of weak ammonia solution through a siphon pump. This weak solution passes into a tube while the ammonia vapor passes into a vapor pipe and on to the water separator.

At this point any water vapor that is condensed can be collected on the drip tray, leaving the dry ammonia vapor to pass to the condenser. Air circulating over the fins of the condenser removes heat from the ammonia vapor. It condenses into liquid ammonia and then flows into an evaporator.

In one form the evaporator is supplied with hydrogen. The hydrogen passes across the surface of the ammonia. It lowers the ammonia vapor pressure enough to allow the liquid ammonia to evaporate. The evaporation of the ammonia extracts heat from the evaporator. This, in turn, extracts heat from the food storage space, lowering the temperature inside the refrigerator.

The mixture of ammonia and hydrogen vapor passes from the evaporator to the absorber. A continuous trickle of weak ammonia solution enters the upper portion of the absorber. It is fed by gravity from the tube. This weak solution flows down through the absorber. It comes into contact with the mixed ammonia and hydrogen gases. This readily absorbs the ammonia from the mixture. The hydrogen is free to rise through the absorber coil and to return to the evaporator. The hydrogen circulates continuously between the absorber and the evaporator.

The strong ammonia solution produced in the absorber flows down to the absorber vessel. It passes on to the boiler system, thus completing the full cycle of operation. This cycle operates continuously as long as the boiler is heated. A thermostat which controls the heat source regulates the temperature of the refrigerated space. Since the refrigerant is ammonia, it can produce quite low temperatures. Except for the thermostatic controls, there are no moving parts. Lithium Bromide or other mediums can be utilized in place of ammonia as well.

Figure 8:
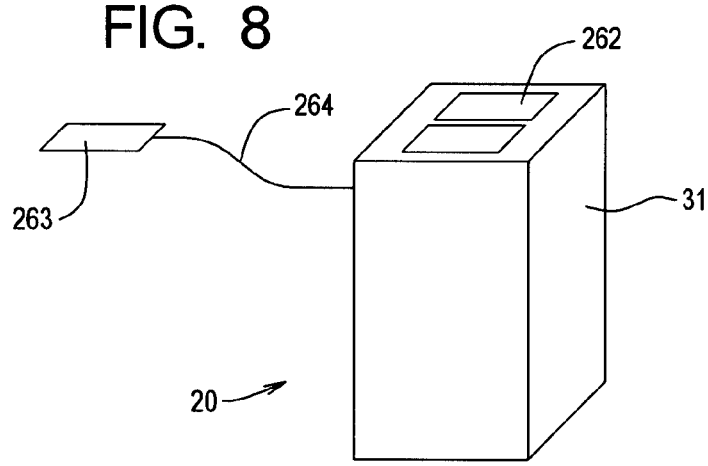
FIG. 8 shows an embodiment where solar panels are utilized to extract energy from the sun for purposes of powering various electrical components.

FIG. 8 shows another embodiment where a solar panel 262 is positioned above the casing 31. Alternately, a remote panel 263 can be employed where electrical currents pass through the line 264. In general, electricity from the solar panel can run various components of the unit. In a preferred form, the unit is gravity fed where a pump does not need to circulate the water. The energy from the solar panel can be used to operate the ozone generation system 40 and perhaps the rotary compressor 57 (in one form) as shown in FIG. 2.

Figure 9:
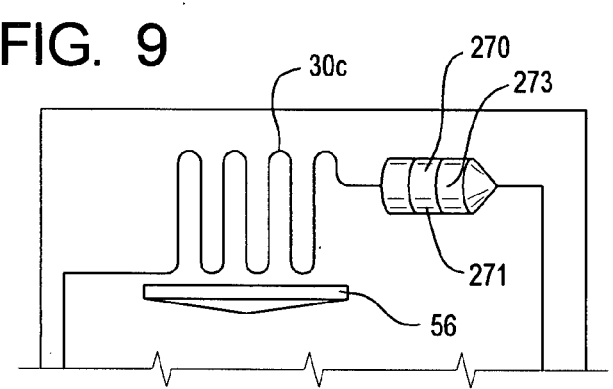
FIG. 9 discloses a thermoacoustic device having a water condensation member in thermal communication with the cold portions of the thermoacoustic device.

FIG. 9 illustrates the system where a thermoacoustic device 270 is utilized to cool the water condensation member 30C. This illustrates another method of cooling the member 30. Thermoacoustics is an emerging field at the time of this writing and shows prospects for allowing sufficient cooling of the member 30C for purposes of condensing and chilling water for consumption.

The thermoacoustic effect is the conversion of sound energy to heat energy (or vice versa) with minimal if any moving parts. In general, a sound wave travels back and forth and the gas medium compresses and expands when the gas compresses it heats up and when it expands it cools off. Further, the medium gas also moves forward and backward in the direction of the sound wave, stopping to reverse direction at the time when the gas is maximally compressed (hot) or expanded (cool).

In one form of implementing a thermoacoustic device, a plate of material in the tube at the same temperature as the gas before the sound wave is started. The sound wave compresses and heats the gas. As the gas slows to turn around and expand, the gas close to the plate gives up heat to the plate. The gas cools slightly and the plate below the hot gas warms slightly. The gas then moves, expands, and cools off, becoming colder than the plate 273. As the gas slows to turn around and expand, the cool gas takes heat from the plate for example 271, heating slightly and leaving the plate adjacent thereto and the gas cooler than it was.

Therefore, one of the plates becomes cooler, and one becomes hotter (or alternatively portions of the same plate are hot and cold depending on the configuration). If a plurality of plates are positioned adjacent to each other providing making a space for the sound to go through, whereby the placement of the plates are arranged in a manner with an optimal length in the optimal area of a tube containing an air medium and heat exchangers are attached thereto to provide thermal communication to get heat transferred in and out of the ends of the plates.

A thermoelectric device that utilizes the Peltier effect could be employed as well. A thermoacoustic or thermoelectric device is particular advantageous in a very space confining environment or where shocks and vibration or rotation of the device with respect to the gravitational field flux would have an adverse effect on a heat pump cycle assembly. Such devices as described in U.S. Pat. No. 5,647, 216 and U.S. Pat. No. 6,725,670 can be utilized which is incorporated by reference.

Figure 10:
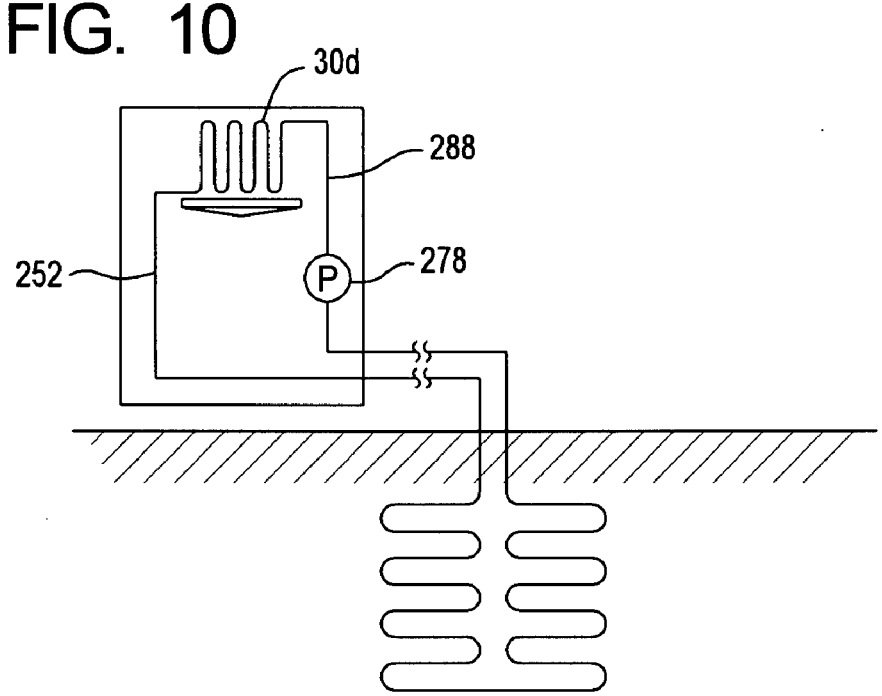
FIG. 10 discloses a geothermal type system where an operating fluid is cooled by way of a cooling grid for purposes of reducing the temperature of the water condensation member.

FIG. 10 shows a system similar to a geothermal system where the cooling member 30D has an operating fluid passing therethrough which is biased by a pump 278 that pumps the fluid through the cooling grid 280. The cooling grid 280 could be submersed in the earth or a large body of water. The water returns through the portion 282 where it is cooler than the downstream portion 284 of the water condensation member 30D. The fluid, which could be water within the line 282, should be sufficiently cold enough below the dew point of the atmospheric air to condense water thereon. In some situations merely cooling the water to approximately 60° F. is sufficiently cool enough to condense water in certain regions of the world. A system such as this could be an affordable, more cost effective implementation to reduce the temperature of the condensation member.

Figure 11:
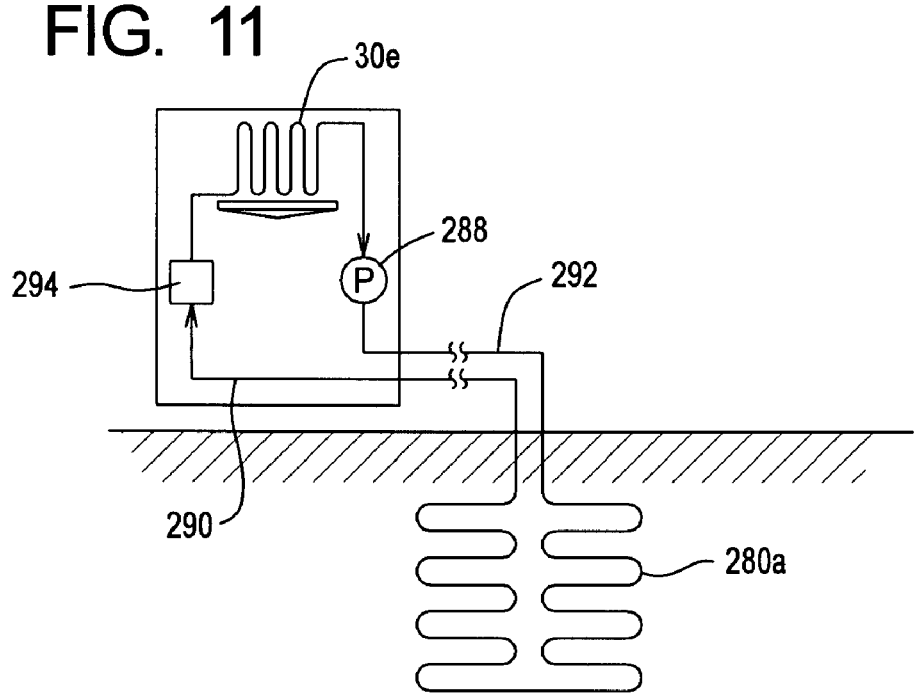
FIG. 11 discloses a geothermal type system and a heat pump-like embodiment where a compressor and expander are utilized to further decrease the temperature of the operating fluid.

FIG. 11 shows a system similar to that shown in FIG. 10 whereby the system resembles a heat pump system where a compressor 288 heats an operating fluid such as a common refrigerant fluid through the cooling grid 280A. At 290, the operating fluid has reduced its temperature from the entry point at 292 and the expander 294 rapidly cools the fluid before being directed to the water condensation member 30E.

Figure 12:
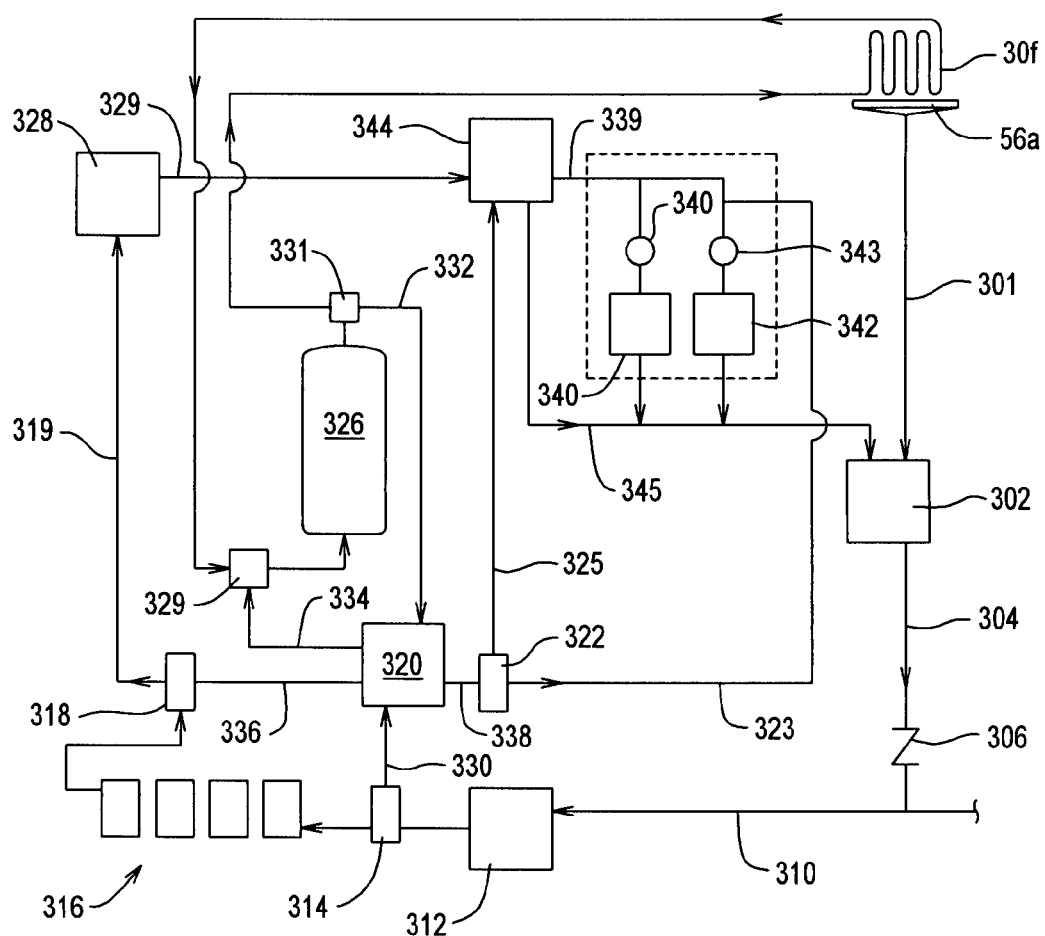
FIG. 12 discloses another water circuit schematic with more of a closed loop variation utilizing a rapid heat exchanger.
Figure 19:
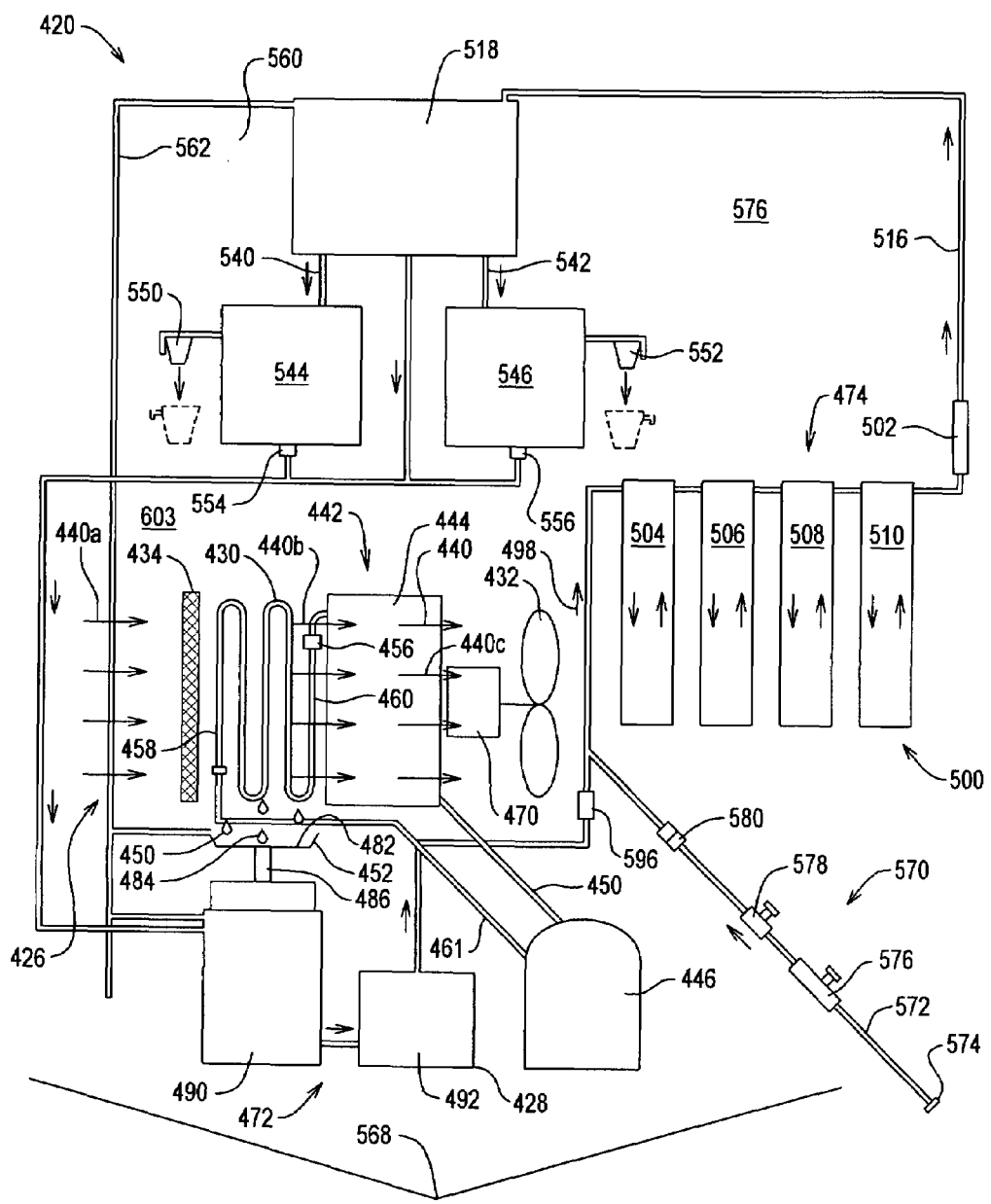
FIG. 19 schematically shows one embodiment of the water producing and delivery device where the various components comprising the device are disclosed therein and showing the potable water fluid circuit.

Referring now to FIG. 12, there is a schematic of a circulation filter system where the water condensation member 30F collects water in this form by a heat pump cycle. The collection tray 56A collects the water droplets which are then in turn passed through line 301 to the bottom tank (first collection tank) 302. Water is then fed through line 304 through the check valve 306 to line 310 by way of the pump 312. Line 308 is optionally attached to tapwater to inject water into the water circuit. The three-way valve 314 which in one form is a solenoid valve (which is how it will be referred to herein) can actually be a plurality of valves which direct fluid from one line to two or more lines. The three-way valve 314 in one form directs water through the bank of filters (filter assembly) 316 which can be similar to the filters 500 as described with reference to FIG. 19 described below. The water then travels through line 317 to the three-way valve 318 where the water is directed through line 319 to the UV light 328. The water is then directed through the line 329 to the top tank 344. The top tank 344 in one form feeds the hot tank 340 by line 339 controlled by the valves 341 and 343. Further, in one form the top tank additionally feeds the cold tank 342 where a cooling system similar to that as described in the embodiment shown in FIG. 19 provides cold water. A dispensing system is in communication with the hot and cold tanks 340 and 342. As described further herein below, the tanks 344, 340 and 342 are in communication with the line 345 which circulates the fluid back to the bottom tank 302. This circulation will occur when the unit is unplugged, for example, and the hot tank needs to dump its contents because it may have grown bacteria once it has cooled. Further, the logic of the system may circulate the hot and cold tanks after a period of time to pass the water through a filter system 316 to ensure bacteria growth is minimized.

There will now be a description of the embodiment schematically shown in 300 in a different mode whereby instant cold water is delivered to the cold tank 342 by way of a different system. In this form, after passing the three-way valve 314, water is passed to line 330 and directed out to line 338 from the rapid heat exchanger 320. The lines 332 and 334 carry a refrigerant fluid where three-way valves 329 and 331 direct the fluid from the compressor from the water condensation member 30F to the lines 332 and 334 to the rapid heat exchanger 320. The valves 329 and 331 can be EPR valves, hot gas bypass valves, Klixon®, etc (these valve types can also be used for 365 and 367 in FIG. 13 below). The valves are present to hold the evaporator coils at more desirable temperature. Further a thermoresistor can be utilized to control the air biasing members or an electronic fluid valve.

The water which is now rapidly chilled passes through line 338 to the optional three-way valve 322. The water then is directed to the cold tank 342 for dispensing cold water. Essentially, this embodiment allows for the compressor to have the functionality of cooling the water condensation member 30F as well as cooling water for the cold tank 342.

Figure 13:
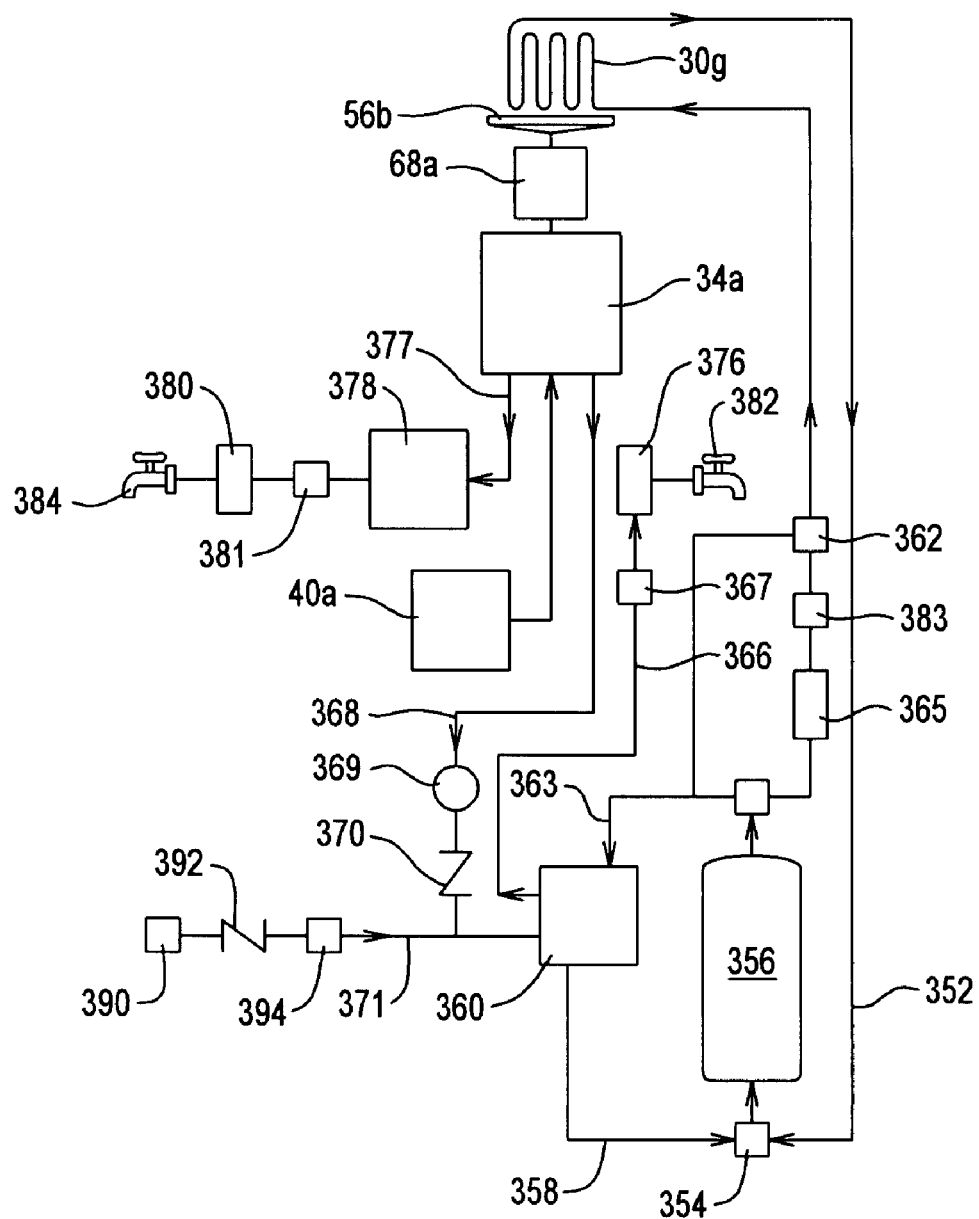
FIG. 13 discloses another variation of a partially closed loop water system utilizing an ozone purification system with a rapid heat exchanger.

Now referring to FIG. 13, there is another similar system where the refrigerant cycle in one form directs refrigerant from the compressor 356 to the three-way valve 362 where refrigerant is directed down line 364 to the condenser coil (hot coil) 365. Thereafter, refrigerant passes to the expander 383 where it cools and is directed through the water condensation member 30G which is an evaporator coil for the refrigerant fluid passing therethrough. The heat refrigerant then passes down line 352 to the three-way valve 354 and is directed back to the compressor 356.

When the pressure switch 367 and line 366 detects the low pressure, the dispersion nozzle 32 is presumably opened where cold water has been extracted therefrom. The water passes through the filter 376 (which is a carbon filter) if the ozone system is used. Water from either line 368 or 371 is passed to the rapid heat exchanger 360. The three-way valves 362 and 354 are switched whereby the refrigerant fluid now passes through line 363 to the rapid heat exchanger 360 which draws heat from the water passing therethrough from line 371 to line 366. The three-way valve 354 allows communication between the compressor 356 and the line 358. When the pressure switch 367 detects an increased pressure whereby water is no longer passing through line 366, the valves 362 and 354 toggle back to the close loop refrigerant cycle system that is in communication with the water condensation member 30G. Of course because this rapid cooling system should desirably allow a minimal amount of water flow before cooled water exits the nozzle through the tube, a pipe fitting should be as short as possible in one form, the rapid heat exchanger 360 is in thermal communication downstream of the expander 383 so there is minimal time for cooling the water flowing through the heat exchanger 360. The heat exchanger 360 would desirably be positioned very close to the nozzle 382 whereas line 366 would presumably be a short as possible.

The water collects from the collection tray 56B through the filter 68A to the main tank 34A. The ozone generation system 40A generates ozone to the tank 34A in a similar manner as described above with reference to FIGS. 1 and 2. The line 377 passes to an instant heater 378 and then through the carbon filter 380 to the dispersion nozzle 384 when the pressure switch 381 detects a low pressure or otherwise a sensor detects that water is desired to be dispersed from the dispersion nozzle 34. The insta-heater is a conventional type instant heater that rapidly raises the temperature by a heat exchanger and usually electrical current passing through a resistor like heater (of course a combustible gas could be used in particular with a continuous absorption device). Further, as described immediately above, water optionally flows through line 368 and is biased by pump 369 to the check valve 370 to the rapid heat exchanger 360 when the pressure switch 367 detects low pressure or a sensing system otherwise detects water is desired to be transferred through the dispersion nozzle 382.

The water entrance line 371 would have a pressure switch 390 which indicates whether that water is hooked up or not, a check valve 392 to ensure water does not flow outwardly towards the tapwater and a solenoid valve or other type of valve 394 which is controlled by a central controller to optionally turn on the water when needed. For example, if the water in the main tank 34A is low, the solenoid valve could allow the tapwater to flow through line 371 to the instant cooled system. Of course optionally, line 371 could be in communication with the line 377 with another valve to allow instant hot water from tap water as well.

Figure 14:
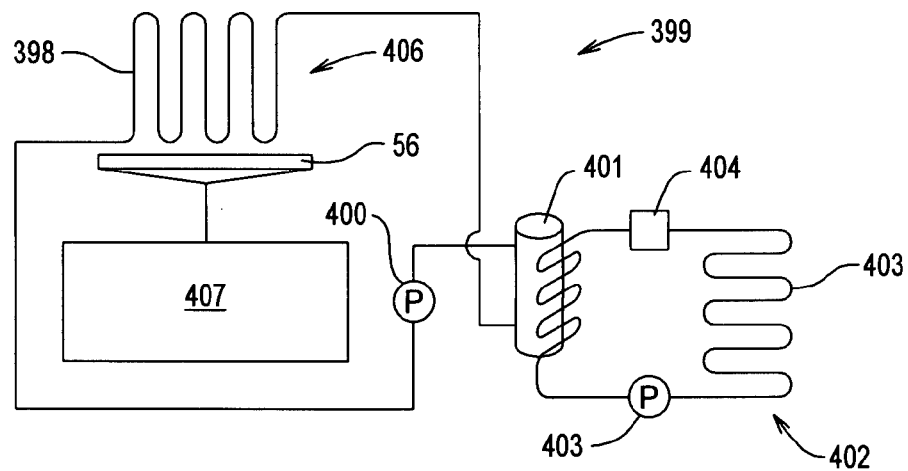
FIG. 14 discloses a dual fluid circuit loop having a heat pump cycle or other type of cooling cycle in thermal communication with a water production circuit with an operating fluid flowing therethrough.
Figure 15:
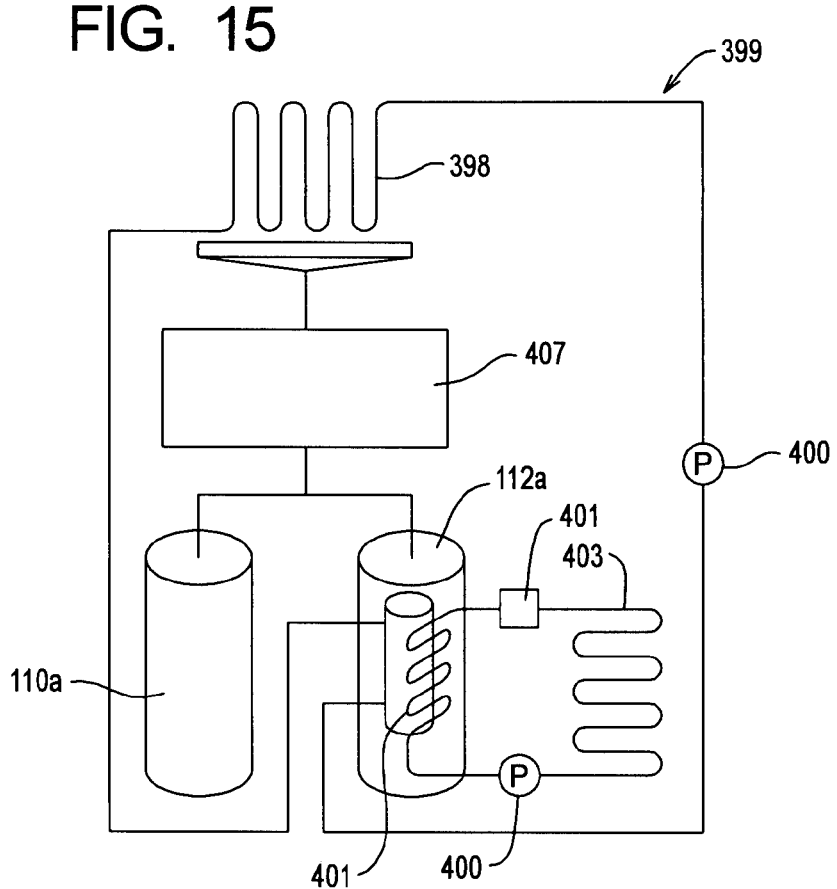
FIG. 15 discloses a similar embodiment to FIG. 14 where the operating fluid sump and/or the cold coil (evaporator coil of a heat pump) is in thermal communication with a cold water tank.
Figure 16:
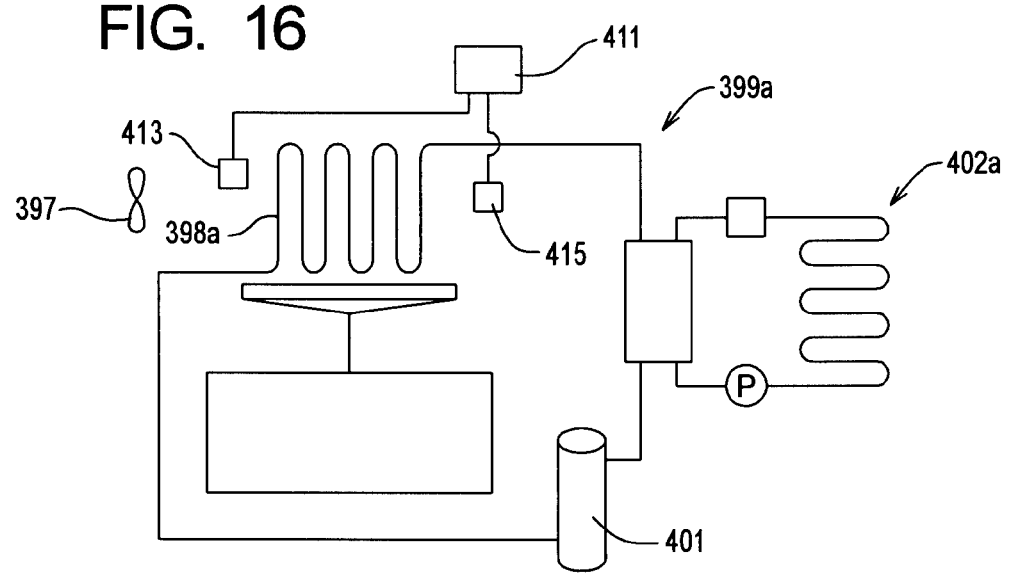
FIG. 16 discloses another embodiment where there is a dual discrete circuit system where the operating fluid of the water producing circuit passes through a rapid heat exchanger.

As shown in FIG. 14, yet another embodiment is shown. FIGS. 14–16 show a system where there are two separate fluid circuits. The embodiments as shown in FIGS. 14–16 allow for a smaller compressor to be utilized which maintains a lower temperature in an operating fluid such as ethanol, glycol, lithium bromide, saline, or another appropriate fluid that has a sufficiently low freezing temperature. In essence, instead of having a compressor which is somewhat potentially overpowered and can cause the water condensation member (which is the evaporator coil in a heat pump cycle) to freeze, additional thermal capacitance is added to the system by way of the second fluid circuit. Further, instead of having the heat pump cycle operate intermittently and turn off when the temperature is too low and freezing begins on the evaporator coil, in the embodiments as shown in FIGS. 14–16, a smaller compressor can be utilized that perhaps operates for longer intervals or continuously where the compressor is less expensive. Further advantages of the system as shown in FIGS. 14–16 will be apparent after the detailed description below.

The system 396 comprises a water condensation member 398 that is a portion of the first circuit 399. The circuit 399 has a fluid biasing members such as the pump 400 that is adapted to circulate an operating fluid such as ethanol or glycol or any of the above mentioned possibilities. The fluid sump 401 is adapted to hold the operating fluid therein and further, as shown in FIG. 14, is adapted to provide a thermal mass for the operating fluid to hold a low temperature. The heat pump cycle (or the second circuit) 402 is essentially a standard heat pump cycle as described above whereby the compressor 403 compresses a refrigerant such as freon or other appropriate fluids through the condenser coil schematically shown at 403 where a fan or other air biasing member passes air therethrough or the coil 403 is otherwise cooled. Thereafter, the refrigerant passes to the expander 404 which reduces the temperature and heat is extracted from the evaporator coil 405 from the sump 401, and more particularly the operating fluid contained therein.

Therefore, it can be appreciated that as the fluid traveling the direction as indicated by arrow 406 passes through the water condensation member 398, it may drop a few degrees depending upon the heat transfer to the ambient air traveling thereby. The operating fluid then passes back to the sump 401 where heat is transferred from the operating fluid to the evaporator coil 405. Because the operating fluid only droped a few degrees and there can be much larger volume of fluid in the sump than there is contained within the water condensation member 30, there is a fair amount of thermal capacitance to the first circuit 399. Because there is a fair amount of thermal capacitance, the system 396 can maintain a more constant temperature at the water condensation member 398, and further, a smaller compressor 403 can be utilized in the second circuit 402. Present cost analysis indicates that a smaller compressor would have considerable savings not only in componentry but further in usage, where although the compressor may operate for longer periods than a comparable system without the first circuit, the overall energy consumption of a smaller compressor would overall be less costly.

Of course it should be noted that the FIGS. 14–16 are highly schematic and would be embodied in figures similar to FIG. 1A where the other componentry such as the water purification and dispersion portions are shown in a highly schematically manner at 407. It should be noted in FIG. 14 that the cooling part of the refrigeration cycle 402 which is namely the evaporator coil can be in thermal communication at any part along the fluid-creating circuit 406. For example, the coil could be wrapped around the flow of the circuit in a countercurrent flow-type arrangement to transfer heat from the water producing fluid circuit to the refrigeration cycle.

As shown in FIG. 14, an air biasing member 397 can be an adjustable fan where a control panel adjusts the volumetric throughput of the fan based upon various input parameters. Empirical analysis indicates that the fan has a tremendous amount effect on how much energy is withdrawn from the water condensation member 398. When the fan is in a lower velocity mode, the air has more time to engage the water condensation member 398 and hence more water or rather the temperature of the air drops further. Referring back to FIG. 29, in some cases depending upon the humidity which can be detected by a humidity sensor, it may be more desirable to not drop the temperature of the air to a lower portion but rather increase the velocity of the air and have a higher volume pass thereby and extract less water per unit of volume of air but having greater units of volume pass by equates to more water that the system produces. Further, the pump 400 can be a variable speed pump, which affects the amount of heat transfer from the heat exchanger such as that as shown 410 in FIG. 16 and further has an effect on the temperature of the water condensation member.

With the foregoing basic description with reference to FIG. 14, there will now be a description of alternative embodiments of FIG. 14 referring to FIGS. 15–16. FIG. 15 shows a similar system where the second circuit 402 and the first circuit 399 have a portion thereof positioned within a cold tank 112a. Essentially, the schematic version shows that the evaporator coil 405 is in thermal communication with the water within the cold tank 112a. In this embodiment, the hot tank 110a can be heated by any conventional means. Essentially, the water in the cold tank 112a is in thermal communication with a cold portion of either the sump 401 or the evaporator 405. This embodiment illustrates how the compressor 403 can fulfill the dual purpose of cooling the cold tank 112a and cooling the operating fluid in the first circuit 399.

FIG. 16 shows another embodiment where the first circuit 399a is in communication with a rapid heat exchanger 410. Essentially, the heat pump cycle 402a is similar to that above except the evaporator is part of a rapid heat exchanger which in one form is a plate heat exchanger. The sump 401 can be smaller than the sump as described in the figures above and the fluid circuit 399a can essentially have less volume of an operating fluid therein where the sump 401a can further having a de-aerating portion to keep the gas out of the line. Alternatively the sump 401a is minimized in volume and essentially non existent if the operating fluid is contained in the fluid circuit is hermetically sealed.

As shown in FIG. 16, there is a schematic view of a control system 411 where the sensors 413 and 415 can provide feedback to the control mechanism 411 as to the temperature and/or humidity. These values can be computed by the control mechanism 411 to calculate the proper desirable exit temperature of the air at the sensor 415. Utilizing a chart such as that as shown in FIG. 29 by the control mechanism 411, the most desirable amount of water can be withdrawn from the air. Further, a pressure sensor acting with the control mechanism 411 can determine which psychrometric chart is utilized for the logic. For example, the chart in FIG. 29 is for a specific pressure where there is actually a three-dimensional grid extending out of the page of FIG. 29 for the various different pressures. Therefore, given for example, the sensor 413 may detect that the atmosphere is at a state as indicated at point 720. Therefore, a certain amount of energy must be withdrawn from the air to get it to a state say at 731 in FIG. 29. Therefore, the control system 411 can adjust the parameters of the system such as the fan 397 which adjusts the amount of air passing thereby and optionally the flow rate of the operating fluid to have an exit temperature measured at sensor 415 that is approximately below past the dew point. Further, the water condensation member 398a can be constructed of a certain size for certain regions to have a most optimal effect.

The a control system 411 and the sensors 413 and 415 can also be utilized in the embodiments as shown in FIGS. 12 and 13 where the control system alters the valves 365 and 367 in FIG. 13 and valves 329 and 331 of FIG. 12. The control of these valves is another method of adjusting the temperature of the evaporator coil. Of course the control system can alter a combination of the evaporator coil and the variable fan (not shown in FIGS. 12 and 13 but schematically shown in FIG. 16).

It should be noted that one perceived benefit of the dual circuit system as shown in FIGS. 14–16, is an increase in efficiency of the water producing system. The evaporator coil 405 is generally specified in length and size with respect to the power of the compressor/pump 403. This size is limiting when trying to extract air directly from an evaporator coil because the length of the coil and available surface area to come in contact with the air as it is biased by is limited. It is desirable to have a lower powered compressor because they are generally less expensive and they further require less power for operation. Therefore, the water condensation member 398 as shown in FIG. 14 can be larger with a separate loop having the operating fluid such as glycol contained therein. Further, there is a fundamental benefit of having the second circuit where reference is again made to FIG. 29.

As shown in this psychrometric chart in FIG. 29, it can be appreciated that the steeper slope of the dew point is at the higher temperatures. Therefore, there is an exponential growth of water of air being able to hold water at higher temperatures. In the same fashion, at higher temperatures per unit of decreased temperature creates a greater amount of water condensing from the air then a similar decrease in temperature at a lower temperature. Therefore, for example, it would be more desirable to cool an air steam to a point indicated at 728 at FIG. 29 to a second point indicated at 731 which decreases the temperature by an amount as indicated at 733 where there is less enthalpy change. This condensation of course requires a certain amount of energy per volume of air (actually condensation produces energy, gives off heat, but for the purpose of describing the refrigeration cycle, lowering the dry bulb temperature of the air requires energy by way of the compressor/pump). To extract the same approximate amount of water with say half the volume of air as immediately described above, the distance 737 indicates a much greater reduction in temperature which equates to a much greater usage of energy to get the same amount of water from point 728 to point 731. Therefore, it would be more advantageous to have a higher volume of air to reduce in temperature from point 728 to point 731 extracting water therefrom than it would be to extract half the volume of air and reduce it to a greater temperature indicated at 735 which would overall equate to the same amount of condensation dropped. In other words, the distance 733 plus 737 is greater than twice the distance of 733 (or the estimated energy differential based on the enthalpy change, but temperature difference comparison gives the general idea). Therefore, it can be appreciated that a greater flexibility of adjusting the fins, overall surface area, low rates, etc. and every other factor dealing with the heat transfer for the water producing circuit 406 and more particularly, the water condensation member 398 than if only this evaporator coil is used.

Figure 18:
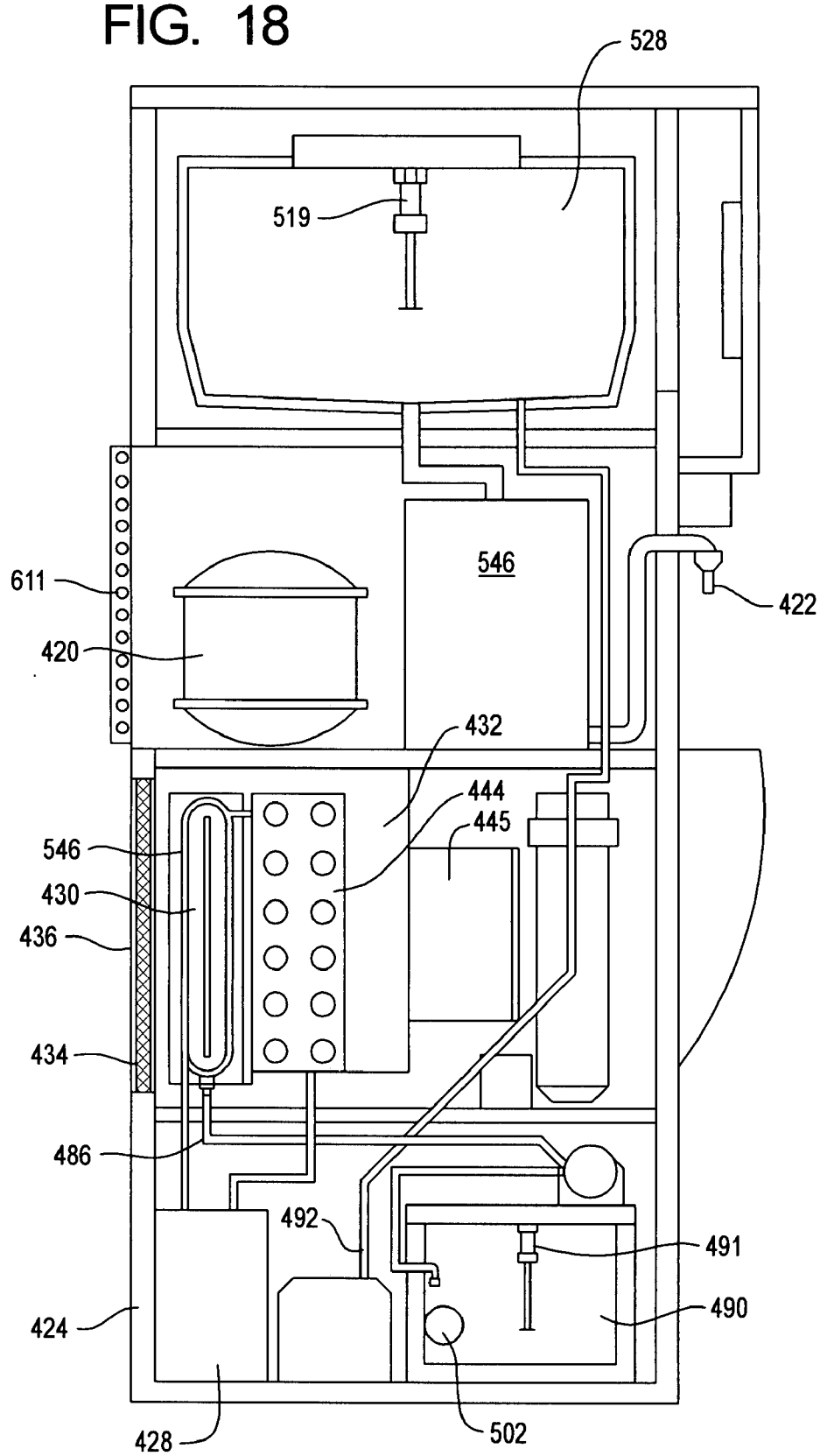
FIG. 18 is a partial schematic cross-sectional view of the water producing and delivery device showing various components therein and a potable water fluid circuit.

With the foregoing description in mind, there is now reference to yet another embodiment with initial reference to FIG. 17. As shown in FIG. 17, the water producing and delivery device 420 comprises a water dispensing area 422 and external housing 424, as shown in FIG. 19, an open loop ambient air system 426 and a potable water fluid circuit 428. The open loop ambient air system 426 comprises a cooling element 430 (in one form an evaporator 430), an air biasing mechanism 432 (an electric rotary fan, such as a squirrel cage fan in one form), and an air filter 434. As shown in FIG. 18, the air filter 434 is positioned at an air inlet port 436 that is a portion of the external housing 424. The external housing 424 can be equipped with acoustic insulation to prevent noise from escaping from the water producing and delivery device 420. The air filter 434 should be upstream of the ambient air flow indicated at 440 in FIG. 19 of the cooling element 430. The cooling element 430 is adapted to be at a temperature preferably above freezing within a few degrees and adapted to have water from the ambient air condense thereon. Therefore, it is desirable to have the air be relatively free of dust particles when passing through the cooling element 430. In one form, the cooling element 430 is part of a heat pump assembly indicated at 442 in FIG. 19.

FIG. 19 schematically shows the heat pump assembly/cycle 442. The heat pump assembly 442 comprises a cooling element/evaporator 430, a condenser 444, and a compressor 446. Between the fluid communication of the condenser 444 and the evaporator 430 is an expander that is not shown. As described above, the expander can be a fluid resistor of some sort to allow a pressure differential between the lower pressure evaporator 430 and the relatively higher pressure condenser 444. The evaporator 430 can be a plate heat exchanger to minimize the size of the unit. Further, contained within the elements of the heat pump assembly 442 is a refrigerant which in one form is R-134A which has desirable condensation and evaporation points for the temperatures that are desirable of the heat pump assembly 442. In general, as the refrigerant liquid exits the compressor 446, the fluid passes through line 450 to the condenser 444 where the ambient air 440 passes around the outer surface of the coil comprising the condenser 444. As the gaseous refrigerant exits the compressor 446 through line 450, it is compressed and heated by virtue of the natural gas law described above. The ambient air indicated at 440C in FIG. 19 that has just exited the cooling element 430, is at a relatively low temperature just above freezing and is cooler than the ambient temperature, and hence provides for a very large temperature gradient whereby rapidly cooling the refrigerant fluid passing through the condenser 444. It should be noted that in one form it is desirable to use the air exiting the cooling element/evaporator 430 and the open loop ambient air system 426 to cool down the condenser 444 because of the large temperature gradient. Normally, in most heat pump applications, this would be a waste of energy whereby the ambient air that is cooled is the same air that is heated not providing any output useful temperature differentiation. However, because in this specific application the desired result is removal of water from the ambient air, it is less crucial to have the exiting air at any specific temperature. However, in one form the air flow can be bifurcated whereby the unit would operate as an air conditioner where the condenser coil is in communication with an outdoor ambient supply and hence the condenser 444 would heat this air and pass that air away from an indoor air supply whereby the ambient air passing through the evaporator 430 would exit at a lower temperature.

Referring back to the main embodiment as shown in FIG. 19, the refrigerant passes through an expander of some sort (not shown) and thereafter passes through an evaporator/cooling element 430. It should be noted that in one form, the cooling element 430 is an evaporator in a heat pump assembly 442. However, in other forms as described further below, the cooling element could be provided by other engineering methods such as thermoelectrics or thermoacoustics described herein. The ambient air indicated at 440B. that passes through the coils of the evaporator 430 is cooled and the relative humidity increases past a dewpoint where water condensation droplets 450 form thereon the outer surface of the cooling element/condenser 430. In one form, the outer surface of the element 430 is coated with a polypropelene material that is particularly hydrophilic and allows the water to collect in droplets and drip therefrom to a drip collection tray 452 described herein.

A thermal sensor 455 and/or 456 is employed that detects the temperature of the outer surface of the cooling element 430. In one form, the thermal sensors 455 and 456 are a thermister that correlates the temperature with electrical resistance for control purposes. It should be noted that the position of the thermal sensors 455 and 456 (or additional thermal sensors) can be placed at various locations along the refrigerant fluid path through the cooling element/evaporator 430. For example, the location of the thermal sensor 456 is just past the output of the condenser 444. Generally, this is the coolest portion of the cooling element 430. It should be noted that it is desirable to have a countercurrent flow of the ambient air stream 440. The incoming air indicated at 440A that is presumably room temperature interfaces with the latter portion of the circuit of the cooling element 430 indicated at 458. Because the transfer of heat to the liquid in the cooling element 430 occurs during the course of its path therealong, the temperature will rise gradually and the ambient air passing therethrough will lower in temperature. Because heat transfer is mandated by a temperature differential, the countercurrent flow of the ambient airstream 440 with respect to the refrigerant liquid within the cooling element 430 is desirable because the ambient air that is presumably much cooler at the portion indicated at 440B, needs a relatively cooler surface at the cooling element near portion 460 to provide a temperature gradient to further cool the air. Therefore, having a thermal sensor 456 at this location 460 along the cooling element 430 is desirable because this presumably will be the coolest portion of the cooling element 430. The refrigerant liquid exits the downstream flow portion 458 of the evaporator/cooling element 430 and passes through line 461 back to the compressor 446 where it is circulated in a close-loop system.

It should be noted that utilizing proper psychrometric principles, having the cooling element 430 a temperature above freezing is desirable to facilitate the condensation of water and extraction of the water droplets 450 to the aforementioned collection drip tray 452. As mentioned above the control system should adjust the temperature of the air and the flow rate to optimize the condensation. Of course the dual loop system as described above with reference to FIGS. 14–16. As described further herein, the temperature sensor 456 in one form is a part of the control circuit 480 where the flow of ambient air by the air biasing mechanism 432 is controlled where the force convection caused by said air biasing mechanism 432 controls the heat transfer from the ambient air strain 440 thereto the cooling element 430. This control mechanism is described further herein following further background description of additional components and their interoperability. A muffler 445 can be positioned downstream of the air biasing mechanism 432 as shown in FIG. 18.

Now looking further upstream of the open loop ambient air system 426, an air filter 434 is preferably upstream of the cooling element 430 and adapted to remove particulate matter therefrom the ambient air strain 440. It should be noted that the ambient air stream 440 is drawn from the ambient air and is presumably at room temperature. Of course, if an air supply that is particularly humid is available in some form, ducting could be provided to direct this air to the open loop ambient air system 426 for extraction of water therein.

To facilitate the flow of the ambient air stream, the aforementioned air biasing mechanism 432 is provided which in one form is a rotary fan powered by an electric motor 470. The electric motor in a desirable form is a variable speed motor which, as described herein, the control circuit 480 dictates the rotational speed and the volumetric throughput of air therethrough based upon inputs from the thermal sensors 455 and/or 456.

Figure 21:
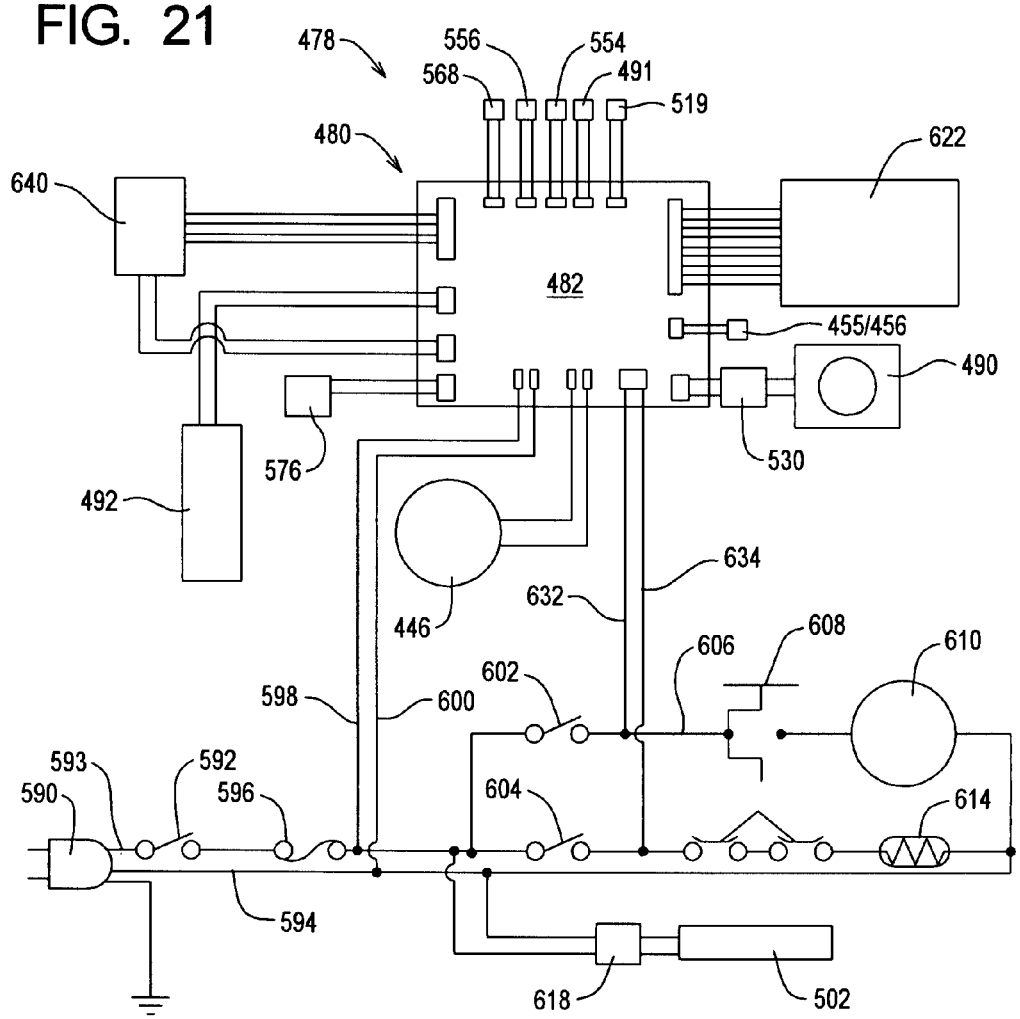
FIG. 21 shows one embodiment of a control circuit controlling the functionality of the water producing and delivery device.

There will now be a discussion of the potable water fluid circuit 428 with reference continuing on FIG. 19. In general, the potable water fluid circuit 428 comprises a water collection portion 472, a filter assembly 474, a water distribution portion 476, and a control system 478. It should be noted that the control system 478 comprises a main controller 480 that is schematically shown in FIG. 21 and further comprises a plurality of sensors and valves positioned throughout the potable water fluid circuit 428. It should further be reiterated that the potable water fluid circuit 428 of the water producing and delivery device 420 is one embodiment of the present invention and various derivatives and variations can be employed without departing from the inventive combination of elements of the system.

The discussion of the potable water fluid circuit 428 will now begin with reference to the lower portion of FIG. 19 where the collection drip tray 452 has an upper surface 482 that defines an open chamber region adapted to have water collected therein. This chamber region converges to a drainage point 484 that is in communication with the collection drip tray line 486 which passes the condensation water droplets 450 to a first reservoir tank 490. The first reservoir tank 490 is essentially a sump providing water to the pump 492 that passes the fluid through a filter assembly 474. Between the fluid circuit of the pump 492 and the filter assembly 474 is a check valve 496 that is adapted to only allow the water to flow in the direction indicated by arrow 498. This check valve 496 prevents back flow of water from the filter assembly 474 which is particularly useful in one orientation the filter assembly 474 is positioned vertically above the pump 492 whereby the hydrostatic pressure of the fluid within the potable water fluid circuit 428 may have a tendency to drain backwards.

After the water passes through the check valve 496, it enters the filter assembly 474 whereby in one form, the filter assembly 474 comprises a purification filter assembly 500 and an ultraviolet filter 502 positioned in the first reservoir tank 490. The purification filter assembly 500 in one form is comprised of a plurality of granular filters that are connected in series and adapted to have water pass therethrough. In one form, the first filter in the water stream is a sediment filter 504 that is adapted to remove particulate matter from the condensed water. Although the condensed water derived from the cooling element 430 is initially relatively pure, various dust particles in the like can accumulate therein and such material is desirably extracted and removed from the water before consumption. One form of the purification of the water is to supply and impregnated by the filter within the filter assembly 474.

Following the sediment filter 504, the water then passes to a zeolite filter 506. The zeolite filter 506 contains a compound with silver. Silver is found to be a very strong antibacterial agent. Normally, a precarbon silver filter is used in a reverse osmosis application and is generally not suitable for a circulatory type system such as the potable water fluid circuit 428 whereby in such a system the silver content would increase to toxic levels. However, a zeolite filter is particularly advantageous because the silver compound does not leave the filter 506 in any appreciable quantities and remains therein for purposes of killing bacteria passing therethrough.

The fluid then exits the zeolite filter 506 and passes to a carbon block filter 508. The carbon block filter is adapted to improve taste of the water and provide other filtering functions. Following the carbon block filter 508 is an ultrafilter/UF filter 510. The UF filter is adapted to remove very fine particulate matter such as that over 0.1 to 0.4 microns and in one form substantially all particles over 0.1 microns. This is particularly conducive for getting the full effect of a UV filter 512 which is now described below.

The UV filter 502 is adapted to emit ultraviolet light that is particularly conducive for killing bacteria. As mentioned immediately above, the UF filter 510 is well-suited for removing small particulate matter. The UF filter in one form has 0.1–0.4 micron pore size and is adapted to potentially remove any particulate matter that is larger than 0.1 microns. It should be noted that a UF filter does not remove ions which are dissolved within water. However, condensed water from air generally has very few ions so a UF membrane filter is particularly conducive for this application. In the alternative, a potassium peroxymonosulfate product which is manufactured by DuPont can be employed, containing colloidal amorphous silica L-Gel 115 which is a formulation of aqueous solution jelled with 15% EH-5 silica gel. Present analysis indicates that this form of the filter would work as well in this application.

It has been found that small particulate matter allows for the production of shadows which provides areas within the water that are not subjected to the ultraviolet electromagnetic radiation. Therefore, bacteria hiding in the shadow areas behind small particulate particles are not destroyed. The UV filter 502 and the UF filter 510 work cooperatively to destroy bacteria and remove very fine particulate matter. It has been found that many UV lights that are off-the-shelf are outside of the electromagnetic wavelength spectrum as proscribed in the product specification. Through much testing and laborious process of elimination, it has been found by the applicant being outside the desirable killing range for bacteria and removing chlorine whereby the effectiveness of such lights is appreciably less than expected. Therefore, having a UV light that preferably has a wavelength in the range of approximately 254 nanometers in length plus or minus 3% in a preferred range, 5% in a broader range and plus or minus 10% in the broadest range allows for the destruction of bacteria contained therein the potable water fluid circuit 428. Or other terms, the C-band ultraviolet light can be between 240 and 270 nm in wavelength for a preferred approximate range and between 200 and 280 nm in a broader range. A NSF/ANSI Standard 255 light capable of killing any water born bacteria, viruses and removing chlorine meeting all standards for potable water can be employed.

After the water exits the UV filter 502 as shown in FIG. 19, the water passes through the line 516 to the second reservoir tank 518. As shown in FIG. 18, the second reservoir tank 518 has a first sensor 519 contained therein. In one form, the first sensor is a trifloat system 521 that is described herein.

The fluid is then directed through either a first output line 540 or a second output line 542 which are in communication with a hot water tank 544 and a cold water tank 546 respectively. The tanks 544 and 546 with the water dispensing area 422 as shown in FIGS. 17 and 18. The hot and cold water faucets 550 and 552 are adapted to dispense hot and cold water from tanks 544 and 546 respectively. The lower portion of the tanks 544 and 546 have control valves 554 and 556 such as solenoid valves that operate with the control system as described further herein.

Now referring back to the second reservoir tank 518 in FIG. 19, a second reservoir overflow line 560 is to drain to the lower tray whereby the tank is overfilled with water for one reason or another (perhaps in a float valve malfunction) the water will pass through the main overflow line 562 and be directed towards the overflow tank 564. The overflow tank 564 comprises an overflow float sensor 568 that is adapted to cooperate with the control system 578 shown in FIG. 21 whereby the overflow float sensor 568 will override all sensors and shut off the heat pump assembly 542. As shown in FIG. 19 in one form the compressor 546 ceases operation and in another form turns off the machine 520 entirely. With regard to FIG. 19, the overflow sensor indicated at 568 in one form can be positioned under the various components in a collection-like drip tray having a downward slope area to a sensor where any leak within the system is detected and can shut off the machine and provide an indication for mechanical assistance. The float valve 568 is adapted to operate in the event that the trifloat system 519 as shown in FIGS. 23–26 malfunctions in some form.

The potable water fluid circuit 528 further comprises an auxiliary water input system 570 which comprises an input line 572 that is connected to a water supply of some sort such as a tap water supply. The line passes through the bulkhead fitting 574, the pressure switch 576 and then continuing through line 572 to the solenoid valve 578 controls the water therethrough and is a part of the control system described further below. A pressure switch 576 is then provided which operates in a manner to provide a protection device that discontinues the communication of the fluid to the potable water fluid circuit 528 as shown in FIG. 19 when large variances in pressure are detected and if there is no tap water pressure the solenoid valve will not operate. The water then flows through the check valve 580 which operates in a similar manner as the previously described check valve 496. The auxiliary water input system 570 is advantageous for automatically providing water when needed in times of low humidity or high use of the machine where water is extracted through the water dispensing area 422 as shown in FIG. 17. The controls of the solenoid valve are integrated with the various float sensors within the system that are described further herein.

There will now be a detailed description of the control system 478. As shown in FIG. 21, there is a schematic circuit that has a main controller 480 comprising a circuit board 482. In general, the circuit board 482 receives voltage signals from a plurality of sensors throughout the system and is adapted to exercise logic to control various solenoids and other operations of the water producing and delivery device 420 to ensure proper operation and automation of the device. The description of the control system 478 will begin with the input power and analyze the various states of the system and the interoperability of the sensors and various components.

Power is supplied to the system from the power input source 590. In one form, and probably the most prevalent, the power input source is a standard 110-volt 60-hertz standard power plug or the European equivalent. Alternatively, a 12 volt input line which is common in many portable like devices such as automobiles and boats could be employed without the use of AC to DC transformers as described below and further having proper compressors and fans that function off of such direct current. The power input passes through a main switch 592. It should be noted that to complete the current, one lead 593 from the power input source 590 can be provided with various switches and the other lead 594 is provided to complete the circuit. The electrical circuit further passes through a fuse 596 that is common in the industry and adapted to break the circuit in the event of a massive amperage overload such as a short circuit. The lines 598 and 600 are in communiaction with lines 593 and 594 respectively to provide power to the main controller 480. The electric power from line 193 further passes and is bifurcated through switches 602 and 604 which are the cold water switch and hot water switch respectively. When the switch 602 is closed, the electricity passes through line 606 through the thermostat 608 to complete a circuit with the cold water compressor 610. As shown in FIG. 18, the cold water compressor 610 has a second heat pump circuit that is adapted to cool the water within the cold water tank 546. The heat pump for the cold water tank operates in a similar manner as the heat pump assembly 442 described above where a condenser 611 is provided in the rear portion of the housing 424 as shown in FIG. 18. The evaporator is in thermal communication with the cold water tank 546. Electric current further passes through switch 604 past the bi-metal switch 612 to the heating element 614 which is adapted to heat the water contained in the hot water tank 544. Power from the lines 593 and 594 downstream from the main switch 592 further is an electrical communication with an ultraviolet ballast 618 which supplies power to the ultraviolet light 502 described above. It should be noted that whenever the master switch 492 is in the closed position during the machine on, the ultraviolet light is always on operating and killing bacteria.

The thermostat 608 is adapted to control the cold water compressor 610 to ensure that the water within the cold water tank 546, as shown in FIG. 19, is kept at a proper cool temperature. In a similar fashion, the bi-metal switch 612 which, in the broader scope, is any thermal related switch, detects the temperature of the water contained in the hot water tank 544 as shown in FIG. 19 and is adapted to close the circuit supply and electricity to the heating element 614 which is shown in FIG. 21 and in thermal communication with the hot water tank 544 as shown in FIG. 19.

Now referring to the upper portion in FIG. 21, the main controller is in electrical communication with a display controller 622 that is adapted to display the status and state of the machine through a display 624 as shown in FIG. 17. Referring back to FIG. 21, the main controller is in electrical communication with a variety of sensors, where as shown in the upper portion, the input sensors 568 for the overflow float sensor, the second float sensor in the first reservoir tank, the thermal sensor 455 and/or 456 are adapted to send electric signals to the main controller 480. The main controller 480 thereby has internal logic to control the cold water solenoid valve 556, the hot water solenoid valve 554, the water input solenoid valve 578, and the compressor 446, as well as the pump 492. Most of these components have been described above in detail and there will now be a description of various states of the water producing and delivery device 420.

Referring now to FIGS. 18, 19 and 21, the second float sensor 491 is adapted to detect the fluid level within the first reservoir tank 490. In a batch-operation-like manner, when the float valve (or other valve proper to detect the height of the water collected) reaches a certain height, the pump 492 is activated and in a manner as described above, the fluid passes through the filter assembly 474 (see FIG. 19) and passes to the first reservoir tank 518. Therefore, this is a continuous process that operates in a batch process as the first reservoir tank 518 fills. Now to provide fluid in the first reservoir tank 490, the heat pump assembly 442, as shown in FIG. 19, must be operating whereby the cooling element 430 is collecting condensate in the drip tray 482. One method of controlling the production of water is to control the operation of the compressor 446 which controls the transportation of refrigerant fluid through the heat pump assembly 442. Therefore, the first sensor 519 detects the state of the three floats as shown in FIGS. 23–26. The trifloat system 521 as shown in FIG. 23 is one form of interfacing with the control system 478 described below. In general, as shown in FIG. 23, each float filter 700, 702 and 704 is adapted to displace vertically depending upon the water level 706. In general, the first float sensor 700 turns on the auxiliary water input system 570 (see FIG. 19). The second float sensor 702 turns off the auxiliary water input system 570 and the third float sensor 604 turns off the open loop ambient air system 426 whereby shutting down the production of water by way of psychrometric principles.

Figure 25:
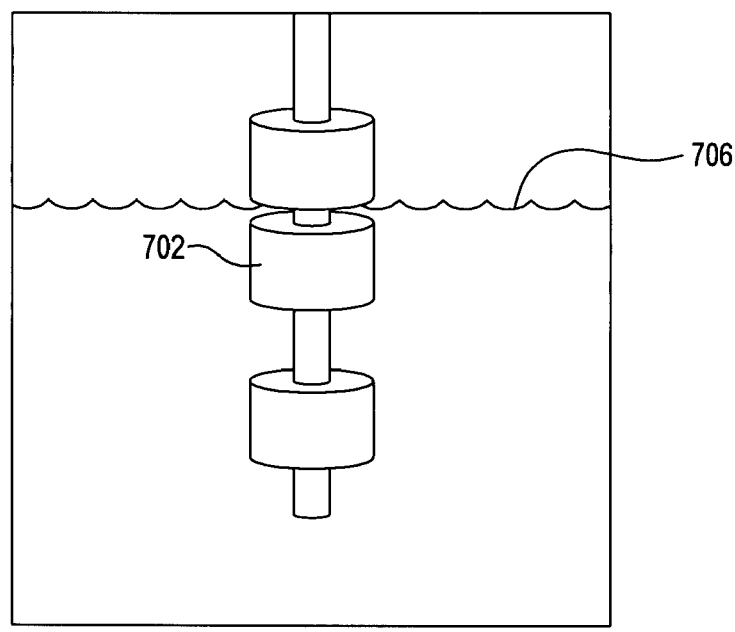
Figure 26:
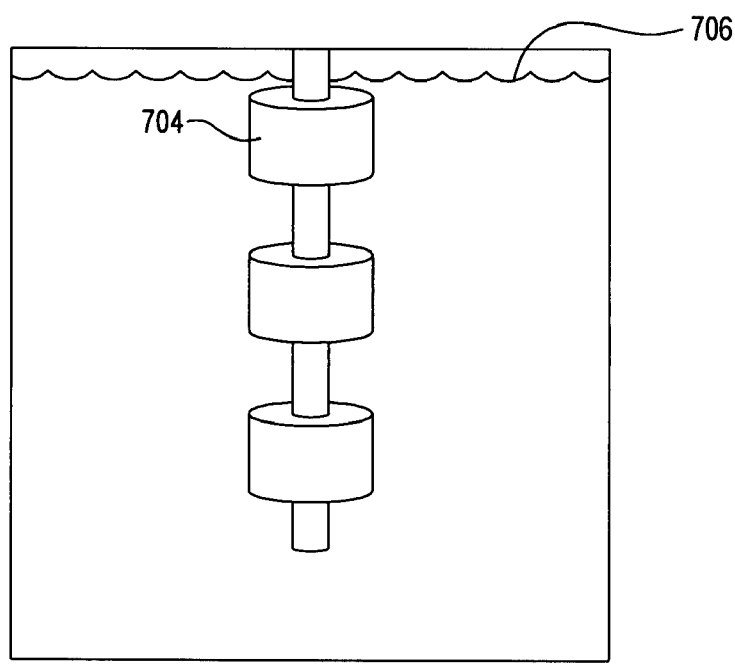

As shown in FIG. 23, the water level within the first reservoir tank 494 where the water level 706 is below the first float sensor 700. The first float sensor 700 is adapted to send a signal to the main controller 480 whereby the main controller 480 will open the solenoid valve 578 whereby introducing water from the auxiliary water input system 570. Now referring to FIG. 24, the first float sensor 700 is in an elevated position and the water level 706 is positioned in between the first and second float sensors 700 and 702. In one form, the water that is presumably tap water that enters from the bulkhead fitting 574 will continue to enter into the potable water fluid circuit 428 until the position as shown in FIG. 25 whereby the water level 706 is above the second float sensor 702 whereby the buoyant force raises said filter and the main controller 480 turns off the solenoid 578 of the auxiliary water input system 570 as shown in FIG. 19. Now referring to FIG. 26, the water level 706 is at a very high level above the third float sensor 704. In this state, the open loop ambient air system 426 is shut down whereby the compressor 444 is turned off and the flow of refrigerant through the heat pump assembly 442 ceases whereby the cooling element 430 will cease to be at a cooler temperature and drawing moisture from the atmosphere. Alternately, any form of cooling element 430 that is provided could be shut off directly by the main controller 480 whereby ceasing the production of water by way of psychrometric principles. The third float valve 704 can further shut down the air biasing system which in one form is an electric fan controlled by the electric motor 470 as shown in FIG. 19.

The trifloat system 519 of course can be varied depending on the programming. For example, in a simpler form one of the upper floats is only utilized or an embodiment such as FIG. 5 press key cap F is utilized where the system continues to run until the unit is full.

A second method of controlling the production of water is done indirectly for the purpose of water control but primarily executed to prevent buildup of frost and freezing on the cooling element 430. The thermal sensors 455 and/or 456 are adapted to detect a below-freezing temperature, or a temperature very close to freezing. The thermal sensors which in one form are thermisters send the signal to the main controller as shown in FIG. 21 and the main controller exercises logic to control the electronic control rheostat 530 which provides a variable rotational speed to the air biasing mechanism 490. As mentioned above, the preferred method of an air biasing mechanism is a rotary fan. The electronically controlled rheostat 530 can for example adjust the amperage or voltage that is supplied to the air biasing mechanism/fan 490, whereby the rotational velocity dictates the volumetric throughput through the open loop ambient air system 426 as shown in FIG. 19. Therefore, a greater throughput of ambient air which is at a higher temperature than the cooling element 430 provides forced convection which facilitates the heat transfer from the ambient air indicated at 440 to the cooling element 430 (and further dumps heat indicated at 40C). This is advantageous because the greater throughput of air further will provide greater condensation droplets 450. Therefore, this control system affects the amount of water entering the potable water fluid circuit 428 and further prevents ice buildup upon the cooling element 430.

The control circuit/main controller 480 further provides for having input lines 632 and 634 that indicate whether the circuits for the cold water compressor 610 and hot water heater 614 are open and hence turned off. In this event, either the cold water solenoid valve 556 or hot water solenoid valve 554 as shown in FIG. 21 as well as in FIG. 19, will open and hence the water contained in the tanks 544 or 546 will drain back to the first reservoir tank 490. Further, the circulation can occur on a timed bases where for example after three hours the cold tank will circulate its contents to kill any bacteria that may have grown in the cold tank. The reason for this circulation of the fluid is to ensure that no bacterial growth occurs in the tanks 544 or 546. In other words, the hot water in tank 544 is sufficiently warm enough to not permit any appreciable amount of bacterial growth therein. Further, the cold water in the tank 546 is sufficiently refrigerated to militate any bacterial growth. However, if either these systems are shut off by switches 602 or 604, out of an abundance of caution, the water contained in either tank 544 or 546, depending on whether switch 602 or 604 is thrown, is circulated through the potable water fluid circuit 428.

Figure 20:
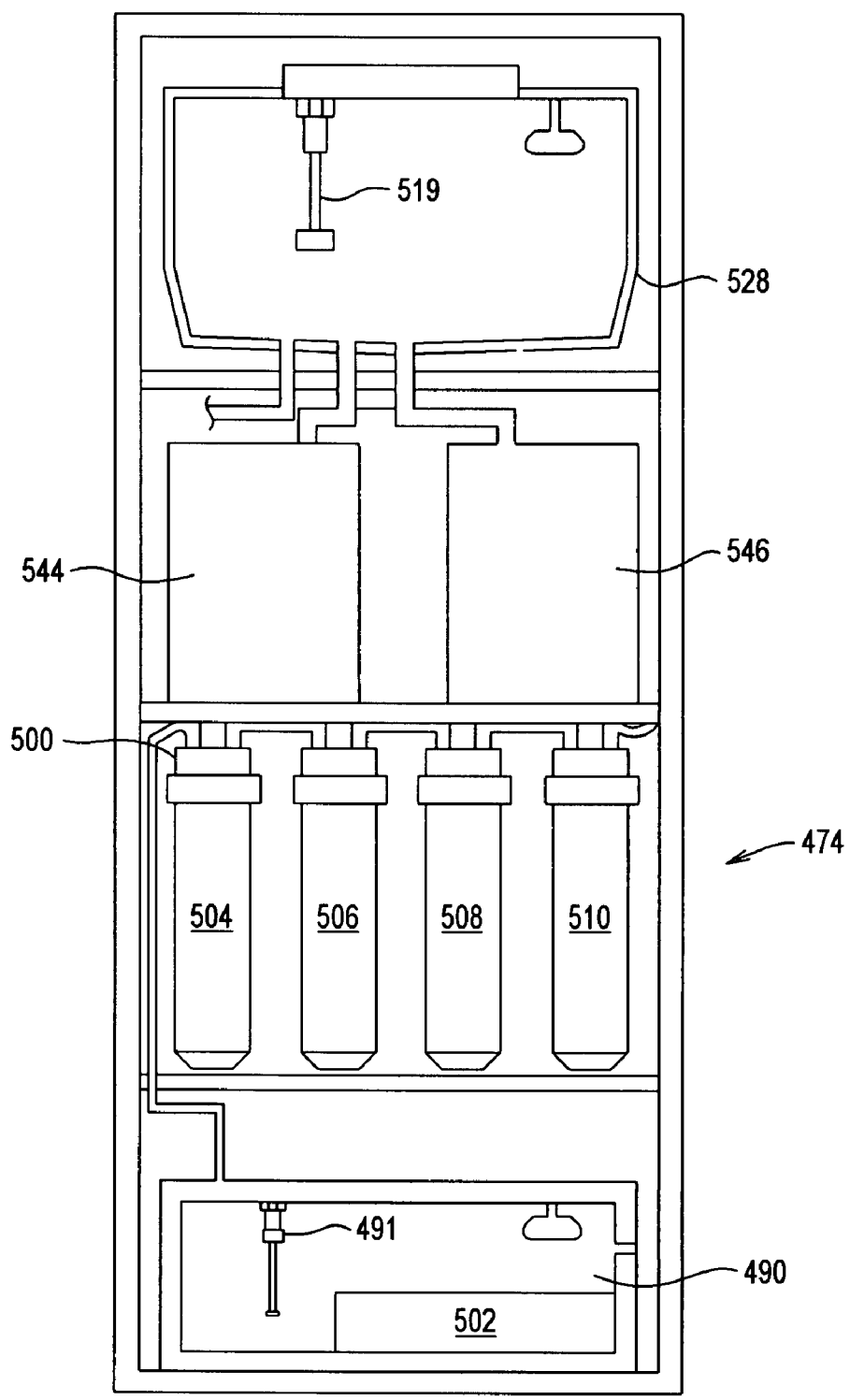
FIG. 20 is a partial schematic view of the cross-sectional front portion of the water producing and delivery device.
Figure 20A:
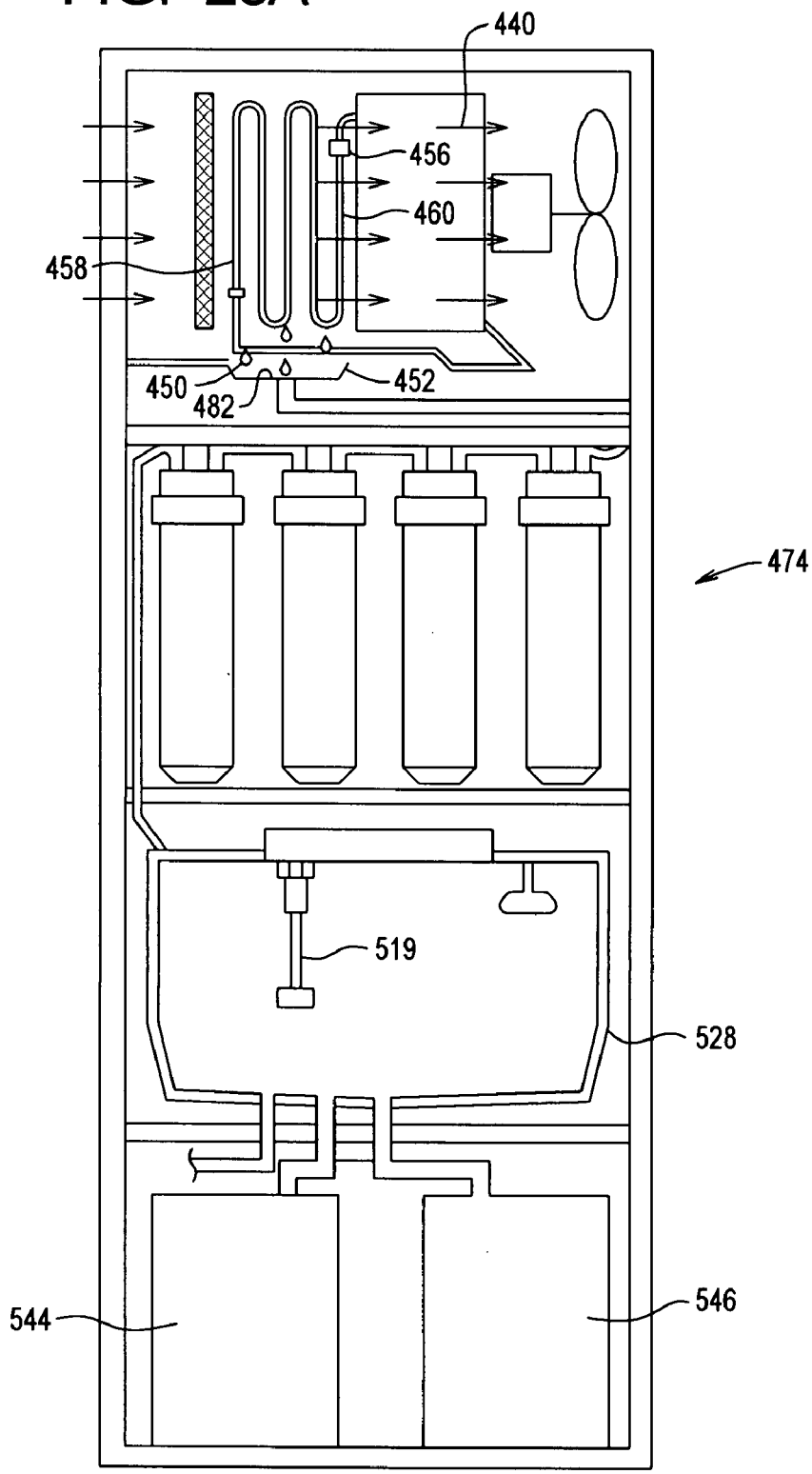
FIG. 20A shows a gravity fed filter system.

FIG. 20A discloses another embodiment of the closed-loop system where the water producing coil is positioned above and can gravity feed to the main tank to the tank 528 whereby assisting at least having the hydrostatic pressure begin at a higher elevation within the system. The water dispensing portion (not shown) is communication with the tanks 544 and 546. However, the schematic drawing and the components can be more vertically compact so the dispensing nozzles such as that as shown in FIG. 17 are delivered by way of hydrostatic pressure.

It should further be noted that a transformer 640 is provided to create 24 volt and 12 volt direct current for functioning of the various equipment components and sensors.

It should further be noted that the first or second reservoir tanks could be replaced with an expandable and collapsible bladder. Where preferably, the second reservoir tank would be of a bladder design that is sealed and can expand and contract depending upon the amount of potable water contained therein. This could be particularly advantageous where the potable water could last for a period of months. In general, an expandable bladder that is not exposed to the atmosphere that only contains clean, substantially bacteria free water therein, has the potential for a shelf stable water supply.

At the time of filing, present experimentation and analysis has indicated that the shape of the coil does not have a large impact as to the effectiveness of condensing water on the outer surface thereof. Mainly, the common coil must be sized for proper surface area and volume to the compressor and the expande for proper functionality within the refrigeration cycle. One method of a coil is shown in FIGS. 27–28a.

Figure 27:
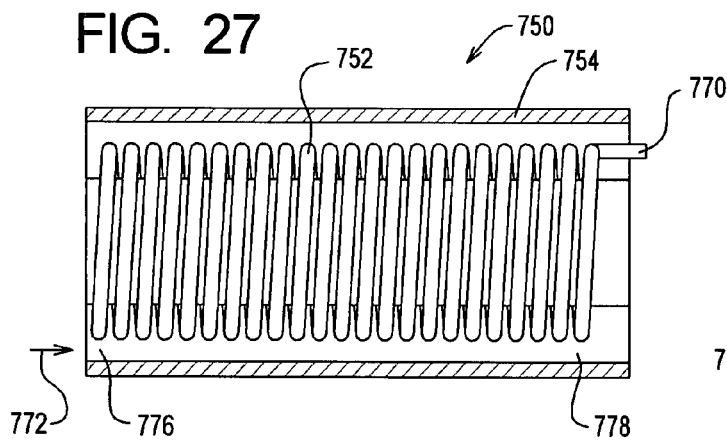
FIGS. 27, 27a, 28 and 28a show one method of a heat exchanger that can function as a cooling element within the open loop air circuit.
Figure 28:
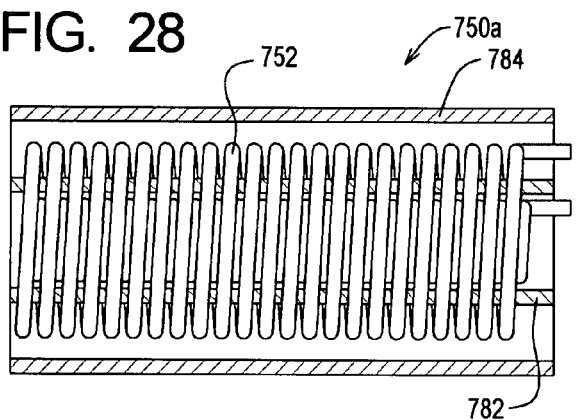
Figure 28A:
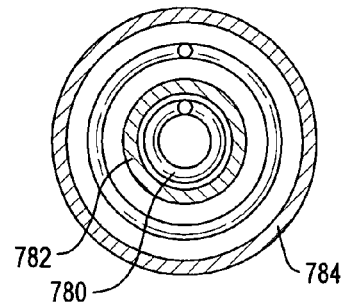

Now referring to FIG. 27, there is shown one form of a heat exchanger that functions as the cooling element 430. In general, it is desirable to cool the incoming air past condensation temperature to collect water droplets therefrom. For example, referring now to FIG. 29, the psychrometric chart schematically indicates the state of an incoming volume of air whereby the location indicated at 720 indicates a certain relative humidity indicated at 722 and a certain absolute humidity 724 of this volume of air. Further, this volume of air is at a certain temperature which is presumably room temperature indicated at 726. Therefore, it is desirable to first cool this incoming volume of air to the location indicated at 728 whereby water has not yet fallen out of the air and the absolute humidity has remained substantially constant; however, the relative humidity is now at 100% and water droplets are now to be drawn from the air as it cools further. It should be noted that although the second temperature 729 correlating to the 100% relative humidity indicated at location 728 in the chart shows a lower temperature that is indicated at 726, no useful amount of water has been produced and extracted from the air.

Figure 27A:
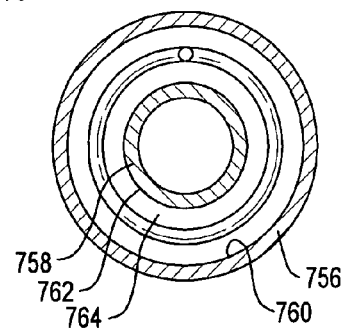

Now referring to FIG. 27, there is shown the heat exchanger 750 which in one form can be the cooling element 430 as described above. In general, the heat exchanger 750 has a coil system 752 and a housing assembly 754. As shown in FIG. 27a, the housing assembly 754 comprises an outer shell 756 and an inner shell 758. The outer shell 756 has an interior surface 760 that cooperates with the outer surface 762 of the inner shell 758 to form an internal cylindrical like chamber 764. The coil 752 is interposed cylindrically between the surfaces 760 and 762 whereby the cylindrical like chamber 764 provides an elongate cylindrical toroidal shaped opening that does not have as large of a volume of air exposed to the coil 752. The coil 752 can operate like a normal evaporator coil where a first end 770 is adapted to have a refrigerant expanded and passed therein. The air flow as indicated by arrow 772 would enter in the "warmer" end of the coil 752 whereby beginning to cool the air from a temperature indicated at 726 and FIG. 29 to a lower temperature to the left-hand portion of the psychrometric chart. In other words, the forward end 776 of the heat exchanger 750 may have a temperature of the coil that is schematically indicated at location 776a in FIG. 29. The colder end indicated at 778 in FIG. 27, may have a lower temperature indicated at 778a in FIG. 29. As described above, this countercurrent flow will allow for a greater temperature differential between the air and the coil throughout the course of the path of travel of the incoming ambient air through the heat exchanger 750.

In general, based on standard psychrometric principles of dehumidification a long cylindrical evaporator coil 752 is a method to maximize water condensation. The coil is always coolest at the end closest the expander following the condenser. By blowing the air from the compressor (warm end) along an increasingly cooler coil it will create more condensation than a standard coil arrangement. Any condensation at the start of the coil will result in a lower dew point as the remaining air now contains less moisture, so with the coil increasingly cooler towards the condensor end as the air travels along it will drop more moisture, as the cooler coil will produce a lower dew point. A cylindrical coil is ideally suited as it can be housed by a piece of food grade plastic pipe and if both connections are engineered to exit on one side of the coil then the plastic pipe can be slid off for easy cleaning of the pipe and coil. The condenser coil can be housed in a similar pipe that can be acoustically insulated to reduce noise from the machine before it is directed to the exit vent.

FIGS. 28 and 28a shows another embodiment of the heat exchanger 750a whereby in some models it may be preferable to put the evaporator coil 780 inside the condenser coil 752 for a more space efficient arrangement. Plastic pipes 782 and 784 can still be inserted over the coils from one end to be easily removed for cleaning.

Figure 22:
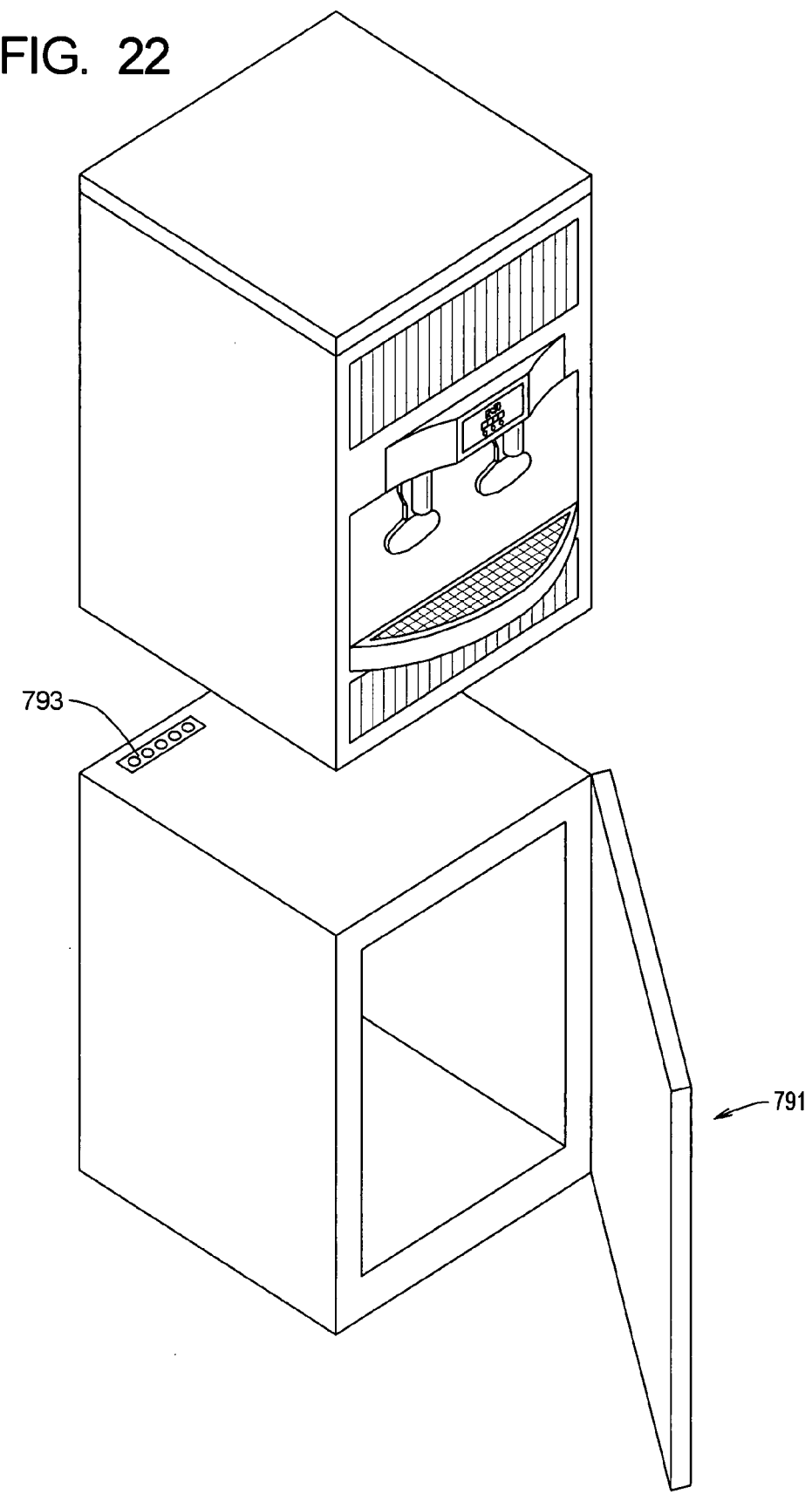
FIG. 22 shows the water producing and delivery device having an upper portion and a lower portion in modular units.

FIG. 22 shows a second embodiment whereby the system 420 has first and second upper and lower portions where the components are ranged in a manner as this embodiment facilitates shipping whereby the elongated housing 424 as shown in FIG. 16 is particularly vulnerable to contortion by loads placed thereon during shipping, whereby two discrete pieces that are adapted to be attached to one another whereby various connectors are employed to connect the various fluid circuits from the lower portion 791 to the upper portion 790. The upper surface 794 can be fitted with an interface connection portion 796 that is adapted to positionally correlate to a receiving section (not shown) of the upper portion 790 shown in FIG. 22 to exchange.

Another bacteria killing apparatus that can replace or work in conjunction with the UF filter 502 is a high-power ultrasound, used for cell disruption, particle size reduction, welding and vaporization that been shown to be 99.99 percent effective in killing bacterial spores after only 30 seconds of non-contact exposure in experiments conducted by researchers at Penn State and Altran Labs, Boalsburg, Pa.

Specially equipped source of inaudible, high frequency (70 to 200 kHz) sound waves and hit for 30 seconds where the water can pass through a circuitous route exposed to the ultra sound. The Penn State and Ulran Labs' experiments mark the first time that Non-Contact Ultrasound (NCU) has been shown to inactivate bacterial spores. The NCU technology could potentially sterilize the air duct systems as well.

The types of various fans to be utilized for the various air biasing members of the centrifugal type devices such as scroll fans, squirrel cage fans and any other type of device to bias air. A squirrel cage fan can be very desirable due to its low decibel rating. The electro-kinetic air transporter is also a viable air biasing mechanism and has the advantage of being relatively quite.

Present analysis indicates that the water produced by the water producing device 20 is particularly useful for producing alcoholic beverages such as beer. It has been found that water content is higher in oxygen which presumably is conducive for the yeast growth in various processes in producing alcohol and more particularly beer. Further other one type of consumable beverages such as coffee, soft drinks, juice drinks etc. have been found to be very desirable with the water which is condensed from the air as produced by the device 20.

The water producing device to be utilized with temporary and permanent inexpensive housing such as Enviro Homes™ that are domelike shape to provide a complete unit of a providing shelter to individuals as well as water.

The water producing and water purification portions can be at separate locations from each other as well as the water dispensing region. For example, the water dispensing region can be at a remote locations such as on a fridge or the like in a different area in the water producing and water purification portions. This allows for a convenient positioning of components were the water producing region is located near air that is more humid or closer proximity to areas requiring air conditioning or heating.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicants' general concept.

We claim:

1. A water producing device adapted to remove moisture from the air in a surrounding environment, the water producing device comprising:
    a. a water condensation member positioned above a collection tray, the water collection tray having a conduit for communication with a main tank operatively configured to have water contained therein,
    b. an ozone generator producing ozone gas that is in communication with the main tank,
    c. a first filter in communication with the main tank that is operatively configured to have ozone pass therethrough and is in communication with the ambient air,
    d. a fluid dispensing portion adapted to provide fluid through a dispensing nozzle,
    e. a second filter positioned between the main tank and the dispensing nozzle for removal of ozone gas.
    f. whereas ozone produced by the ozone generator that entered the main tank remains in the main tank or passes through an ozone removing filter while exiting the main tank so the ozone does not to exit to the surrounding environment from the main tank.

2. The water producing device as recited in claim 1 whereby the first filter further is in communication with the collection tray to allow water to pass through to the main tank.

3. The water producing device as recited in claim 1 whereby the first and second filters are carbon filters.

4. The water producing device as recited in claim 2 whereby the first and second filters are carbon filters.

5. The water producing device as recited in claim 2 an ultraviolet filter is either the first or second filter and the ultraviolet light is in the C-band range.

6. The water producing device as recited in claim 1 whereby the main tank is in communication with a hot water member and a cold water member whereby the hot water member is adapted to heat water therein to a hot dispensing nozzle and the cold water member is adapted to cool cold water therein and disburse water to a cold dispensing nozzle.

7. The water producing device as recited in claim 6 whereby the second filter is positioned interposed in the fluid circuit between the hot water member and the hot dispensing nozzle and another second filter is positioned between the cold water member and the cold dispensing nozzle.

8. The water producing device as recited in claim 6 whereby the hot water member is an instantaneous heater and the cold water member is a rapid cold water producing device.

9. The water producing device as recited in claim 7 where the cold water member is a plate heat exchanger for removing heat from the water of the cold holding tank.

10. The water producing device as recited in claim 6 whereby the second filter is positioned in the fluid circuit between the main tank and the hot water member and the cold water member.

11. The water producing device as recited in claim 1 whereby the ozone generator has a first end and a second end and is comprised of a first electrically conducting cylinder and a second electrically conducting cylinder positioned substantially concentric therein where the first electrically conducting cylinder has an interior coating of an acid resistant material and the second electrical conducting cylinder has an outer coating of an acid resistant material whereby air is adapted to flow between the inner coating and the outer coating where a spark from a voltage differential between the first and second electrically conducting cylinders creates ozone therein where air enters from the first end and exits to the second end where it is directed to the main tank.

12. The water producing device as recited in claim 11 where a safety mechanism is attached to the hot water dispensing nozzle to prevent scalding.

13. The water producing device as recited in claim 11 where a diffuser distributes the ozone in the maintain and the ozone bubbles travels radially outwardly to the perimeter region of the main tank to mitigate the growth of biofilm thereon.

14. The water producing device as recited in claim 1 whereby the water condensation member is an evaporator coil in communication with a heat pump cycle having a pump and expander and a condenser coil where the evaporator coil is cooler than the condenser coil.

15. The apparatus as recited in claim 14 where the water condensation member has baked phenolic coating thereon.

16. The apparatus as recited in claim 14 whereby the compressor is a linear compressor.

17. The water producing device as recited in claim 1 whereby an air biasing member is adapted to blow ambient air across the water condensation member.

18. The apparatus as recited in same claim 17 where a control system controls the amount of air based upon a temperature gauge downstream of the air flow of the water condensation member.

19. The apparatus as recited in claim 17 where the air biasing member is a squirrel cage fan.

20. The water producing device as recited in claim 14 whereby an air biasing member is adapted to blow ambient air across the evaporator coil.

21. The water producing device as recited in claim 1 whereby the water condensation member has a conduit therein that is in communication with the water from the main tank.

22. The water producing device as recited in claim 21 whereby a main tank line is in communication with the main tank and passes through a first heat exchanger that cools the water in the main tank line before passing to the water condensation member.

23. The water producing device as recited in claim 22 whereby the heat exchanger is a plate heat exchanger extracting heat from the main tank line using a heat pump cycle.

24. The water producing device as recited in claim 22 where a cooling coil is positioned in the main tank to cool the water therein to aid in condensation as it travels through the water condensation member.

25. The water producing device as recited in claim 1 whereby a casing is provided having an air inlet positioned at an upper portion of the casing and an air exit positioned at a lower portion of the casing.

26. The water producing device as recited in claim 25 whereby an air biasing member is positioned near the air exit of the casing where a condenser coil of a heat pump cycle is positioned along the path of the moving air in the lower portion of the casing.

27. The water producing device as recited in claim 1 whereby an air inlet is positioned at a first longitudinal portion of a casing of the water producing device and an air exit is positioned at a second longitudinal portion of the casing where an air biasing member is adapted to move air from the air inlet to the air outlet passing the water condensing member.

28. The water producing device as recited in claim 1 where a casing is provided that houses the other components of the water producing device where an air outlet downstream of the water condensation member is channeled to in an area for air conditioning purposes.

29. The water producing device as recited in claim 27 where the water producing device further comprises a refrigeration cycle where an evaporator is thermal communication with the water condensation member.

30. The water producing device as recited in claim 29 where a second air inlet and a second air outlet are provided in their adapted to direct air across a condenser coil of the refrigeration cycle.

31. The water producing device as recited in claim 29 where the evaporator provides cool air for air conditioning purposes.

32. The water producing device as recited in claim 30 where the second air outlet is directed to an area that requires heated air.

33. The water producing device as recited in claim 27 where the air biasing member is an electro-kinetic air transporter.

34. The water producing device as recited in claim 1 where the condensed water is delivered to the dispensing nozzle by way of hydrostatic pressure.

35. The water producing device as recited in claim 1 where the water is biased from condensate on the water condensation member to the dispensing nozzle by way of only hydrostatic pressure.

36. The water producing device as recited in claim 1 whereby the water condensation member is cooled by a thermoacoustic device.

37. The water producing device as recited in claim 1 whereby the water condensation member is cooled by a continuous absorption device.

38. The water producing device as recited in claim 1 whereby an operating fluid passing through the water condensation member passes through a cooling grid to lower the temperature of the operating fluid before reinserting it through the water condensation member.

39. The water producing device as recited in claim 38 whereby the cooling grid is positioned in the earth.

40. The water producing device as recited in claim 39 whereby a pump compresses the operating fluid before entry of the cooling grid and an expander downstream of the cooling grid reduces the temperature of the operating fluid for the water condensation member.

41. A water producing device adapted to condense water from air as water condensate, the water producing device comprising:
  a. a water collection portion comprising:
    i. a water condensation member positioned above a water collection tray where water condensate is adapted to drip downwardly from the water condensation member to an upper surface of the water collection tray, ii. a conduit in communication to a lower opening of the collection tray and adapted to take water therefrom,
b. a purification portion comprising:
i. an iodine filter adapted to expose iodine to the water,
ii. a water delivery portion comprising an iodine removing filter positioned downstream from the iodine filter adapted to remove iodine from the water,
iii. a dispensing nozzle downstream of the iodine removing filter.

42. The water producing device as recited in claim 41 where a hot tank and a cold tank are provided downstream of the main tank and are in communication with a hot dispensing nozzle and a cold dispensing nozzle respectively.

43. The water producing device as recited in claim 41 whereby the iodine removing filter is positioned upstream of the hot water tank and the cold water tank.

44. The water producing device as recited in claim 43 where the iodine removing filter is a carbon filter.

45. The water producing device as recited in claim 41 where the iodine filter is comprised of a first and second carbon filters that are respectively positioned downstream of the hot water tank and cold water tank.

46. The water producing device as recited in claim 41 whereby a main tank line is in communication with the main tank and passes through a first heat exchanger that cools the water in the main tank line before passing to the water condensation member.

47. The water producing device as recited in 46 where the main tank line is in communication with a cold dispensing line in communication with a cold dispensing nozzle downstream of the heat exchanger where a pressure sensor detecting low pressure in the cold dispensing line activates a pump of a rapid cooling circuit.

48. An apparatus to condense water from the air, the apparatus comprising:
a. a water producing circuit comprising a water condensation member in fluid communication with a fluid line adapted to have an operating fluid pass therethrough,
b. a pump in fluid communication with the water communication circuit adapted to bias the operating fluid therethrough,
c. a refrigeration cycle comprising:
i. a evaporator coil member in thermal communication with the operating fluid that is adapted to transfer heat from the operating fluid,
ii. an expander upstream of the condensor coil and downstream from a evaporator coil,
iii. a compressor interposed in the fluid circuit between the evaporator coil and the condenser coil,
d. whereby the refrigeration cycle and the water producing circuit are fluidly discrete circuits.

49. The apparatus as recited in claim 48 where the water producing circuit comprises an operating fluid having a freezing level below that of water to pass through the water condensation member.

50. The apparatus as recited in claim 49 where the operating fluid is propylene glycol.

51. The apparatus as recited in claim 48 were the operating fluid is withdrawn from condensate from the water condensation member.

52. A water producing apparatus having:
a first fluid circuit with an operating fluid traveling therethrough, the first fluid circuit passing through a water condensation member that is positioned in an airstream where ambient air passes thereby and water is adapted to condense on the water condensation member,
a second fluid circuit having a heat pump cycle having a condenser, evaporator, expander and a compressor where the evaporator coil is in thermal communication with a portion of the first fluid circuit to draw heat therefrom,
a compressor operates to maintain the temperature in the first fluid circuit sufficiently below the dewpoint of the ambient air and a control system monitors the temperature of the air stream to adjust the rate of the flow of air base upon the temperature of the air stream.

53. The water producing apparatus water producing apparatus as recited in claim 52 where the sensor is downstream of the water condensation member in the air flow.

54. The water producing apparatus as recited in claim 53 where surface area of the water condensation member is greater than the surface area of the evaporator whereby a control system maintains the exit temperature in at a dry temperature below the dew point of ambient air and the air biasing member is adapted to maintain an optimum downstream temperature to produce a greater amount of water condensate to form than if to just the evaporator coil was utilized to condense water.

55. The water producing apparatus as recited in claim 52 where the thermal communication between the evaporator and the first fluid circuit is by way of a plate heat exchanger.

56. A system for producing water from air having evaporated water therein by forming condensation droplets, the system comprising:
a. a water condensation member adapted to be positioned in an air stream having the evaporated water and further have the condensation droplets formed thereon,
b. a collection tray adapted to collect condensation droplets from the water condensation member,
c. a first collection tank in communication with the collection tray,
d. a fluid line in communication with the first collection tank that is adapted to bias the water through the filter assembly,
e. a refrigeration circuit having an evaporator coil in thermal communication with a heat exchanger, the heat exchanger having an inlet port and an outlet port adapted to allow water to pass therethrough downstream from the filter assembly,
f. a valve system adapted to direct refrigerant to either the heat exchanger or to the water condensation member,
g. whereby the heat exchanger outlet port is in communication with a dispenser nozzle for distributing cold water.

57. The system for producing water as recited in claim 56 where the valve system to direct refrigerant to the water condensation member directly passes refrigerant through the water condensation member.

58. The system as recited in claim 56 where the valve system to direct refrigerant to the water condensation member directs refrigerant to be in thermal communication with the water condensation member for reducing the temperature of the water condensation member.

59. The system for producing water as recited in claim 56 where the first collection tank passes water to the dispenser nozzle by way of hydrostatic pressure.

60. The system for producing water as recited in claim 59 where the water passes through the filter assembly by way of gravity.

61. The system for producing water as recited in claim 59 where the filter assembly includes an ozone generator that is in communication with the first tank.

62. The system for producing water as recited in claim 56 where the water downstream of the first collection tank is pumped through the filter assembly.

63. A method of producing water by way of condensing water vapor from the air, the method comprising:
   a. directing an air stream across a water condensation member,
   b. collecting water condensation from the surface of the water condensation member and directing the water through first filter to a tank,
   c. providing communication of the water within the tank to an ozone source to kill bacteria,
   d. providing access from the tank to the surrounding atmosphere where gas developed in the tank is directed to a first filter for removal of ozone,
   e. providing an outlet from the tank to water dispensing area and removing the ozone upstream of the water dispensing area by way of a second filter where the water from the whereas water condensation from the water condensation member to the water dispensing area is by hydrostatic pressure of the water.

64. The method as recited in claim 63 where the first filter has water condensation from the water condensation member flowing in a downward direction therethrough and gas in the main tank is passed in an upward direction through the first filter to the surrounding atmosphere.

65. The method of producing water as recited in claim 63 where the first and second filters are carbon filters.

66. The method of producing water as recited in claim 64 where the first filter is a single filter.

67. The method of producing water as recited in claim 64 where the first filter is comprised one filter for the water condensation and a separate filter for the gas in the tank.

* * * * *